United States Patent
Mori et al.

(10) Patent No.: US 12,158,934 B2
(45) Date of Patent: Dec. 3, 2024

(54) PHOTOGRAPHING CONTROL DEVICE, SYSTEM, METHOD, AND NON-TRANSITORY COMPUTER-READABLE MEDIUM STORING PROGRAM

(71) Applicant: NEC Corporation, Tokyo (JP)

(72) Inventors: Yusuke Mori, Tokyo (JP); Takeshi Yamaguchi, Tokyo (JP); Honami Yuki, Tokyo (JP); Shuuji Kikuchi, Tokyo (JP)

(73) Assignee: NEC CORPORATION, Tokyo (JP)

(*) Notice: Subject to any disclaimer, the term of this patent is extended or adjusted under 35 U.S.C. 154(b) by 287 days.

(21) Appl. No.: 17/801,111

(22) PCT Filed: Mar. 12, 2020

(86) PCT No.: PCT/JP2020/010897
§ 371 (c)(1),
(2) Date: Aug. 19, 2022

(87) PCT Pub. No.: WO2021/181623
PCT Pub. Date: Sep. 16, 2021

(65) Prior Publication Data
US 2023/0106309 A1    Apr. 6, 2023

(51) Int. Cl.
*G06F 21/32* (2013.01)
*G06V 40/16* (2022.01)
*G06V 40/50* (2022.01)

(52) U.S. Cl.
CPC ............ *G06F 21/32* (2013.01); *G06V 40/171* (2022.01); *G06V 40/172* (2022.01); *G06V 40/50* (2022.01); *G06F 2221/2117* (2013.01)

(58) Field of Classification Search
CPC ............ G06F 21/32; G06F 2221/2117; G06V 40/171; G06V 40/172; G06V 40/50
(Continued)

(56) References Cited

U.S. PATENT DOCUMENTS

| 11,812,183 B2 * | 11/2023 | Hanahara ............. H04N 23/611 |
| 2013/0044922 A1 * | 2/2013 | Hio .................... G06Q 30/0261 382/118 |

(Continued)

FOREIGN PATENT DOCUMENTS

| JP | 2013-041416 A | 2/2013 |
| JP | 2016-126414 A | 7/2016 |
| JP | 2018-038029 A | 3/2018 |

OTHER PUBLICATIONS

International Search Report for PCT Application No. PCT/JP2020/010897, mailed on Aug. 4, 2020.

*Primary Examiner* — Liang Che A Wang
(74) *Attorney, Agent, or Firm* — Sughrue Mion, PLLC.

(57) ABSTRACT

A photographing control device includes: a first acquiring unit that acquires a first photographed image obtained by a first photographing device; a first authentication controlling unit that causes an authentication device to perform first facial authentication of the first photographed image; a calculating unit that calculates, in the first photographed image, a proportion of an area of a facial region; a second acquiring unit that acquires a second photographed image capturing the person and obtained by a second photographing device installed within a predetermined range from the first photographing device and having a wider angle than the first photographing device, if the proportion is no smaller than a predetermined value; a second authentication controlling unit that causes the authentication device 200 to perform second facial authentication of the second photographed image; and an output unit that outputs the second photographed image to the outside.

11 Claims, 16 Drawing Sheets

(58) Field of Classification Search
USPC .......................................... 713/186; 709/224
See application file for complete search history.

(56) References Cited

U.S. PATENT DOCUMENTS

| | | | | |
|---|---|---|---|---|
| 2014/0147034 A1* | 5/2014 | Ito | ..................... | G06F 18/214 |
| | | | | 382/155 |
| 2017/0332050 A1* | 11/2017 | Yamashita | ........... | G06V 40/172 |
| 2019/0206012 A1* | 7/2019 | Granich | ............. | G06Q 30/0261 |

* cited by examiner

PHOTOGRAPHING CONTROL DEVICE, SYSTEM, METHOD, AND NON-TRANSITORY COMPUTER-READABLE MEDIUM STORING PROGRAM

This application is a National Stage Entry of PCT/JP2020/010897 filed on Mar. 12, 2020, the contents of all of which are incorporated herein by reference, in their entirety.

TECHNICAL FIELD

The present invention relates to photographing control devices, systems, methods, and non-transitory computer-readable media storing programs.

BACKGROUND ART

Patent Literature 1 discloses a technique of taking a commemorative photograph by use of facial authentication technology. The facial authentication system described in Patent Literature 1 performs a facial comparison between a facial image included in an in-area image photographed within a recreational facility and a registration image registered at a lodging facility. The facial authentication system described in Patent Literature 1 allows each guest to obtain an in-area image that includes himself or herself.

Meanwhile, Patent Literature 2 discloses a technique of confirming a visit at each location in a so-called stamp rally, whose aim is achieved by visiting a plurality of locations, through facial authentication performed by use of cameras installed at respective locations. Herein, a stamp rally is also referred to as a point rally.

CITATION LIST

Patent Literature

Patent Literature 1: Japanese Unexamined Patent Application Publication No. 2016-126414
Patent Literature 2: Japanese Unexamined Patent Application Publication No. 2013-41416

SUMMARY OF INVENTION

Technical Problem

A photographed image captured by a camera installed for facial authentication is for facial authentication and thus may not capture the background appropriately. Therefore, such a photographed image is disadvantageously insufficient as an image for commemorative photographing.

The present disclosure has been made to solve such an issue and is directed to providing a photographing control device, a system, a method, and a program for providing a photographed image that can serve the purpose of facial authentication and commemorative photographing simultaneously.

Solution to Problem

A photographing control device according to the present disclosure includes: first acquiring means for acquiring a first photographed image capturing a person and obtained by a first photographing device installed at a predetermined location; first authentication controlling means for causing an authentication device storing an association between identification information and facial feature information of a predetermined person to perform first facial authentication of the first photographed image by use of the facial feature information; calculating means for calculating, if the first facial authentication has succeeded, a proportion, in the first photographed image, of an area of a facial region authenticated successfully in the first facial authentication; second acquiring means for acquiring a second photographed image capturing the person and obtained by a second photographing device installed within a predetermined range from the first photographing device at the predetermined location and having a wider angle than that of the first photographing device, if the proportion is no smaller than a predetermined value; second authentication controlling means for causing the authentication device to perform second facial authentication of the second photographed image by use of the facial feature information; and output means for outputting the second photographed image, if the second facial authentication has succeeded.

A photographing control device according to the present disclosure includes: storing means for storing an association between identification information and facial feature information of a predetermined person; first acquiring means for acquiring a first photographed image capturing a person and obtained by a first photographing device installed at a predetermined location; first authenticating means for performing first facial authentication of the first photographed image by use of the facial feature information; calculating means for calculating, if the first facial authentication has succeeded, a proportion, in the first photographed image, of an area of a facial region authenticated successfully in the first facial authentication; second acquiring means for acquiring a second photographed image capturing the person and obtained by a second photographing device installed within a predetermined range from the first photographing device at the predetermined location and having a wider angle than that of the first photographing device, if the proportion is no smaller than a predetermined value; second authenticating means for performing second facial authentication of the second photographed image by use of the facial feature information; and an output means for outputting the second photographed image, if the second facial authentication has succeeded.

A photographing control system according to the present disclosure includes: a first photographing device installed at a predetermined location; a second photographing device installed within a predetermined range from the first photographing device at the predetermined location and having a wider angle than that of the first photographing device; an authentication device including storing means configured to store an association between identification information and facial feature information of a predetermined person and authenticating means configured to perform facial authentication by use of the facial feature information; and a photographing control device, wherein the photographing control device is configured to acquire a first photographed image obtained by the first photographing device and capturing a person, cause first facial authentication of the first photographed image to be performed by use of the facial feature information, calculate, if the first facial authentication has succeeded, a proportion, in the first photographed image, of an area of a facial region authenticated successfully in the first facial authentication, acquire a second photographed image obtained by the second photographing device and capturing the person, if the proportion is no smaller than a predetermined value, cause second facial authentication of the second photographed image to be performed by use of the facial feature information, and output the second photographed image, if the second facial authentication has succeeded.

A photographing control method according to the present disclosure includes: acquiring a first photographed image capturing a person and obtained by a first photographing device installed at a predetermined location; causing an authentication device storing an association between identification information and facial feature information of a predetermined person to perform first facial authentication of the first photographed image by use of the facial feature information; calculating, if the first facial authentication has succeeded, a proportion, in the first photographed image, of an area of a facial region authenticated successfully in the first facial authentication; acquiring a second photographed image capturing the person and obtained by a second photographing device installed within a predetermined range from the first photographing device at the predetermined location and having a wider angle than that of the first photographing device, if the proportion is no smaller than a predetermined value; causing the authentication device to perform second facial authentication of the second photographed image by use of the facial feature information; and outputting the second photographed image, if the second facial authentication has succeeded.

A photographing control method according to the present disclosure executed by a computer configured to store an association between identification information and facial feature information of a predetermined person includes: acquiring a first photographed image capturing a person and obtained by a first photographing device installed at a predetermined location; performing first facial authentication of the first photographed image by use of the facial feature information; calculating, if the first facial authentication has succeeded, a proportion, in the first photographed image, of an area of a facial region authenticated successfully in the first facial authentication; acquiring a second photographed image capturing the person and obtained by a second photographing device installed within a predetermined range from the first photographing device at the predetermined location and having a wider angle than that of the first photographing device, if the proportion is no smaller than a predetermined value; performing second facial authentication of the second photographed image by use of the facial feature information; and outputting the second photographed image, if the second facial authentication has succeeded.

A non-transitory computer-readable medium according to the present disclosure has a photographing control program recorded thereon, the photographing control program causing a computer to execute: a process of acquiring a first photographed image capturing a person and obtained by a first photographing device installed at a predetermined location; a process of causing an authentication device storing an association between identification information and facial feature information of a predetermined person to perform first facial authentication of the first photographed image by use of the facial feature information; a process of calculating, if the first facial authentication has succeeded, a proportion, in the first photographed image, of an area of a facial region authenticated successfully in the first facial authentication; a process of acquiring a second photographed image capturing the person and obtained by a second photographing device installed within a predetermined range from the first photographing device at the predetermined location and having a wider angle than that of the first photographing device, if the proportion is no smaller than a predetermined value; a process of causing the authentication device to perform second facial authentication of the second photographed image by use of the facial feature information; and a process of outputting the second photographed image, if the second facial authentication has succeeded.

A non-transitory computer-readable medium according to the present disclosure has a photographing control program recorded thereon, the photographing control program causing a computer configured to store an association between identification information and facial feature information of a predetermined person to execute: a process of acquiring a first photographed image capturing a person and obtained by a first photographing device installed at a predetermined location; a process of performing first facial authentication of the first photographed image by use of the facial feature information; a process of calculating, if the first facial authentication has succeeded, a proportion, in the first photographed image, of an area of a facial region authenticated successfully in the first facial authentication; a process of acquiring a second photographed image capturing the person and obtained by a second photographing device installed within a predetermined range from the first photographing device at the predetermined location and having a wider angle than that of the first photographing device, if the proportion is no smaller than a predetermined value; a process of performing second facial authentication of the second photographed image by use of the facial feature information; and a process of outputting the second photographed image, if the second facial authentication has succeeded.

Advantageous Effects of Invention

The present disclosure can provide a photographing control device, a system, a method, and a program for providing a photographed image that can serve the purpose of facial authentication and commemorative photographing simultaneously.

EXAMPLE EMBODIMENT

Figure 1:
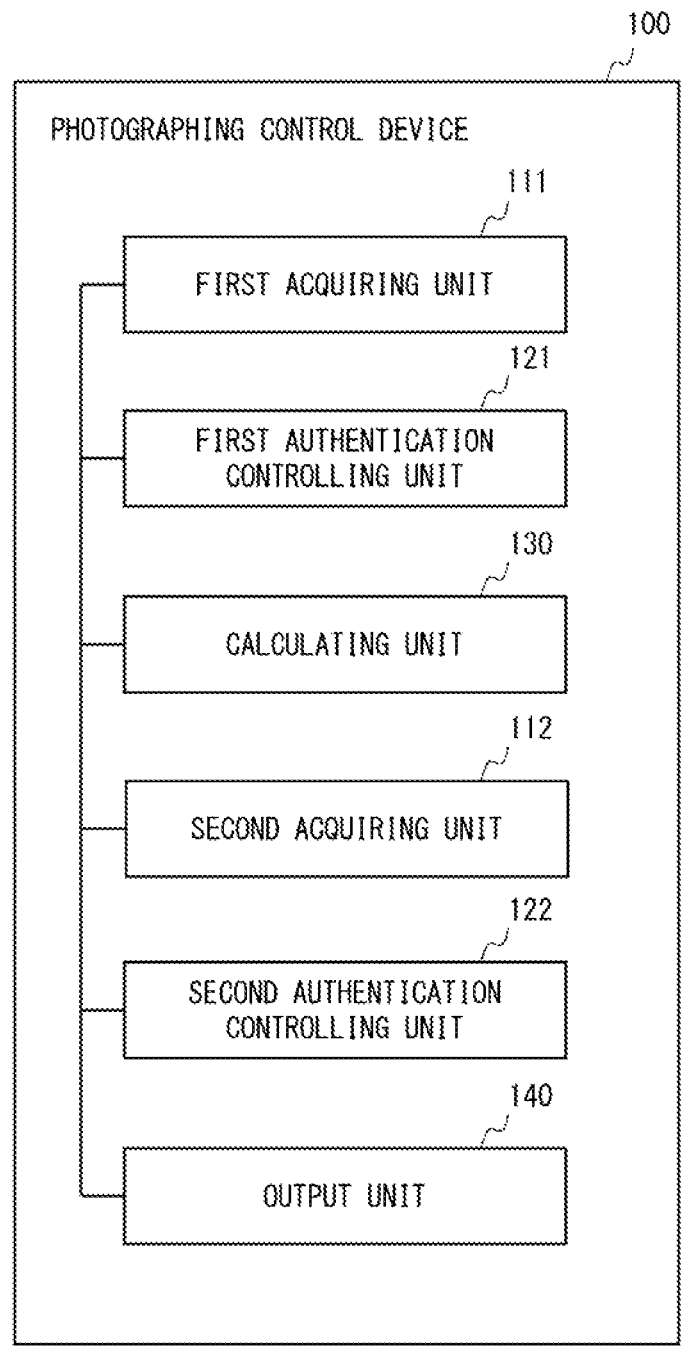
FIG. 1 is a block diagram illustrating a configuration of a photographing control device according to a first example embodiment.

Hereinafter, some example embodiments of the present disclosure will be described in detail with reference to the drawings. In the drawings, identical or corresponding elements are given identical reference characters, and duplicate description thereof will be omitted as necessary in order to make the description clearer.

First Example Embodiment

FIG. 1 is a block diagram illustrating a configuration of a photographing control device 100 according to a first example embodiment. The photographing control device 100 includes a first acquiring unit 111, a first authentication controlling unit 121, a calculating unit 130, a second acquiring unit 112, a second authentication controlling unit 122, and an output unit 140. The photographing control device 100 is connected to a network 500 (not illustrated). The network 500 may be a wired network or a wireless network. An authentication device 200, a first photographing device 700, and a second photographing device 800 (none illustrated) are connected to the network 500.

The first acquiring unit 111 acquires a first photographed image obtained by the first photographing device 700 and capturing a person. The first photographing device 700 is installed at a predetermined location X. The first photographing device 700 is installed, for example, at a location to be visited in a point rally or the like. The first authentication controlling unit 121 causes the authentication device 200 to perform first facial authentication of the first photographed image by use of facial feature information. In this example, the authentication device 200 stores an association between identification information and facial feature information of a predetermined person.

If the first facial authentication has succeeded, the calculating unit 130 calculates the proportion, in the first photographed image, of the area of the facial region authenticated successfully in the first facial authentication. If this proportion is no smaller than a predetermined value, the second acquiring unit 112 acquires a second photographed image obtained by the second photographing device 800 and capturing the same person. The predetermined proportion is set as desired and is, for example, 30%. The second photographing device 800 is installed within a predetermined range from the first photographing device 700 at the predetermined location X. The second photographing device 800 has a wider angle than the first photographing device 700.

The second authentication controlling unit 122 causes the authentication device 200 to perform second facial authentication of the second photographed image by use of the facial feature information. If the second facial authentication has succeeded, the output unit 140 outputs the second photographed image to the outside.

Figure 2:
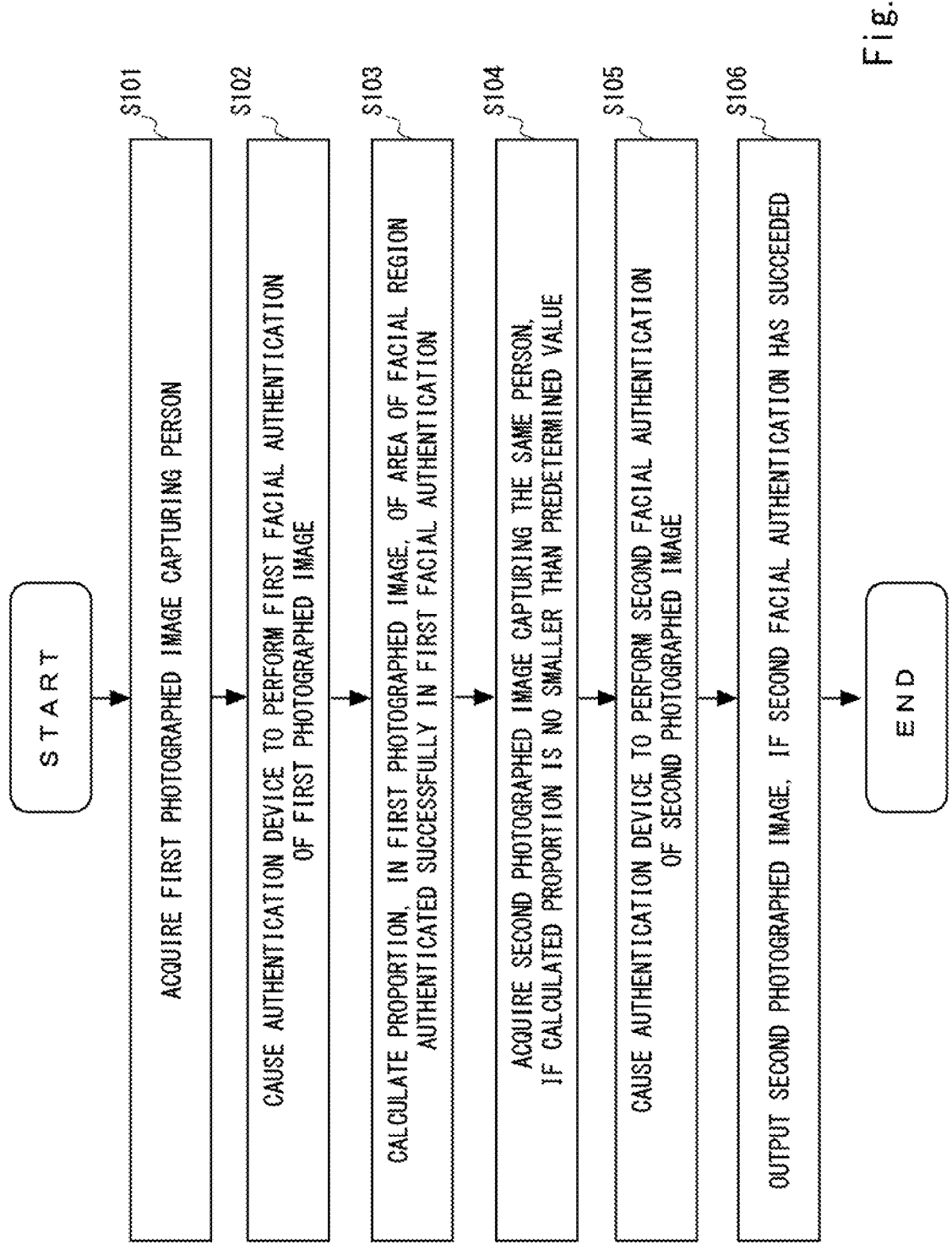
FIG. 2 is a flowchart illustrating a flow of a photographing control method according to the first example embodiment.

FIG. 2 is a flowchart illustrating a flow of a photographing control method according to the first example embodiment. Herein, the authentication device 200 holds an association between identification information and facial feature information of a predetermined person.

First, the first acquiring unit 111 acquires a first photographed image obtained by the first photographing device 700 and capturing a person (step S101). Next, the first authentication controlling unit 121 causes the authentication device 200 to perform first facial authentication of the first photographed image (step S102).

Next, if the first facial authentication has succeeded, the calculating unit 130 calculates the proportion, in the first photographed image, of the area of the facial region authenticated successfully in the first facial authentication (step S103). Next, if the proportion calculated at step S103 is no smaller than a predetermined value, the second acquiring unit 112 acquires a second photographed image obtained by the second photographing device 800 and capturing the same person (step S104). Next, the second authentication controlling unit 122 causes the authentication device 200 to perform second facial authentication of the second photographed image (step S105). Lastly, if the second facial authentication has succeeded at step S105, the output unit 140 outputs the second photographed image to the outside.

As described above, it has been difficult with conventional techniques to obtain an image that can serve the purpose of facial authentication and commemorative photographing simultaneously. In contrast, a photographing control system 600 according to the present example embodiment, if the background captured in a first photographed image is not sufficient, acquires a second photographed image captured by a wider-angle camera. Accordingly, the photographing control system 600 according to the present example embodiment can provide a photographed image that can serve the purpose of facial authentication and commemorative photographing simultaneously.

Herein, the photographing control device 100 includes, as its components, a processor, a memory, and a storage device (none illustrated). The storage device stores a computer program that implements the processes of the photographing control method according to the present example embodiment. The processor loads the computer program from the storage device onto the memory and executes the computer program. Thus, the processor implements the functions of the first acquiring unit 111, the first authentication controlling unit 121, the calculating unit 130, the second acquiring unit 112, the second authentication controlling unit 122, and the output unit 140.

Alternatively, the first acquiring unit 111, the first authentication controlling unit 121, the calculating unit 130, the second acquiring unit 112, the second authentication controlling unit 122, and the output unit 140 may each be implemented by a dedicated piece of hardware. A part or the whole of the constituent elements of each device may be implemented by, for example, general-purpose or dedicated circuitry, a processor, or a combination thereof. Such constituent elements may be formed by a single chip or by a plurality of chips connected via a bus. A part or the whole of the constituent elements of each device may be implemented by a combination of the above-described circuitry or the like and a program. For the processor, a central processing unit (CPU), a graphics processing unit (GPU), a field-programmable gate array (FPGA), or the like can be used.

In a case where a part or the whole of the constituent elements of the photographing control device 100 is implemented by a plurality of information processing devices, circuitries, or the like, these information processing devices, circuitries, or the like may be disposed centrally or distributedly. For example, these information processing devices, circuitries, or the like may be implemented in a mode in which they are connected to each other via a communication network, as in, for example, a client server system or a cloud computing system. The function of the photographing control device 100 may be provided in a Software as a Service (SaaS) format.

Second Example Embodiment

A second example embodiment is a modification example of the first example embodiment described above. The photographing control device 100 according to the first example embodiment performs individual authentication by the external authentication device 200. In contrast, a photographing control device 100 according to the second example embodiment performs individual authentication within the device.

Figure 3:
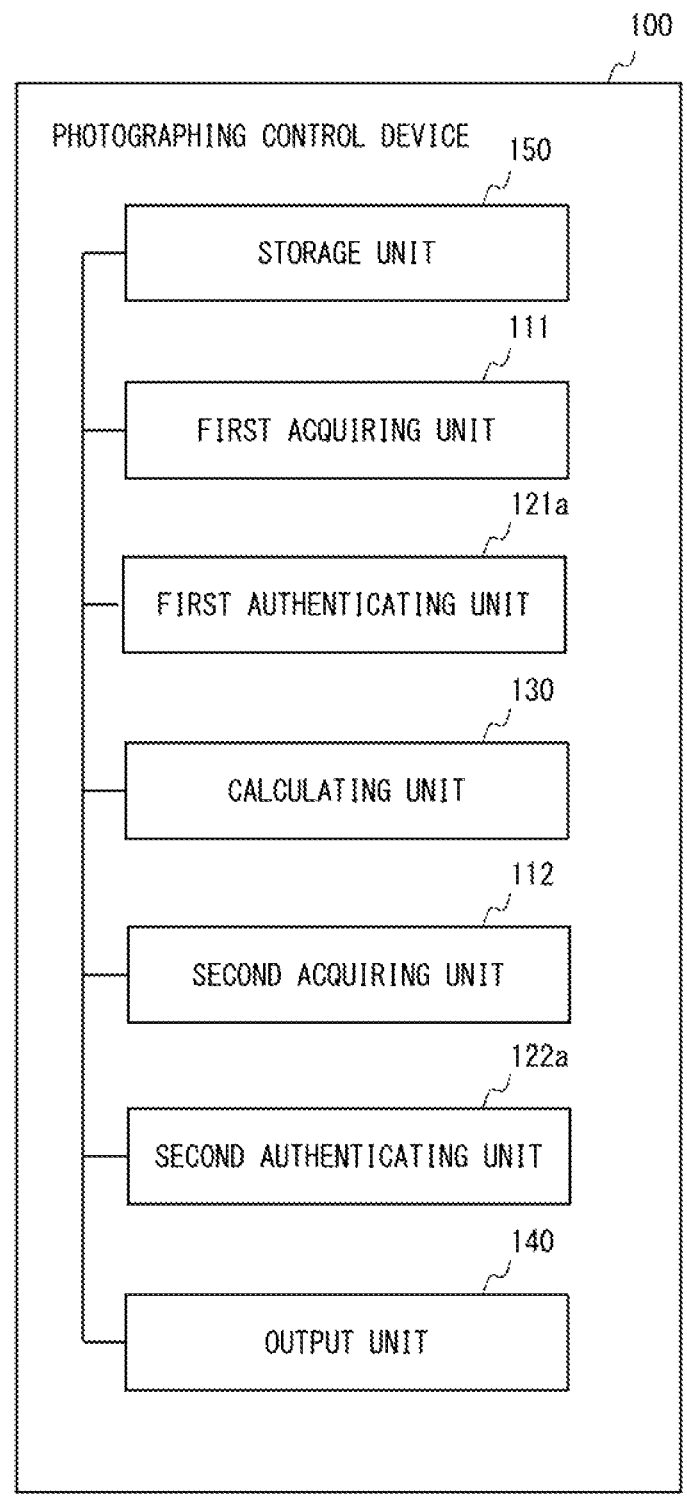
FIG. 3 is a block diagram illustrating a configuration of a photographing control device according to a second example embodiment.

FIG. 3 is a block diagram illustrating a configuration of the photographing control device 100 according to the second example embodiment. The photographing control device 100 includes a storage unit 150, a first acquiring unit 111, a first authenticating unit 121*a*, a calculating unit 130, a second acquiring unit 112, a second authenticating unit 122*a*, and an output unit 140. The functions of the first acquiring unit 111, the calculating unit 130, the second acquiring unit 112, and the output unit 140 are similar to those according to the first example embodiment, and thus description thereof will be omitted.

The storage unit 150 according to the second example embodiment stores an association between identification information and facial feature information of a predetermined person. The first authenticating unit 121*a* according to the second example embodiment performs first facial authentication of a first photographed image by use of the aforementioned facial feature information. The second authenticating unit 122*a* according to the second example embodiment performs second facial authentication of a second photographed image by use of the aforementioned facial feature information.

A flow of a photographing control method according to the second example embodiment is similar to the flow illustrated in FIG. 2. However, at step S102, the first authenticating unit 121*a* performs the facial authentication of the first photographed image by use of the facial feature information stored in the storage unit 150. At step S105, the second authenticating unit 122*a* performs the facial authentication of the second photographed image by use of the facial feature information stored in the storage unit 150.

In this manner, the second example embodiment too can provide advantageous effects similar to those provided by the first example embodiment described above.

Third Example Embodiment

Figure 4:
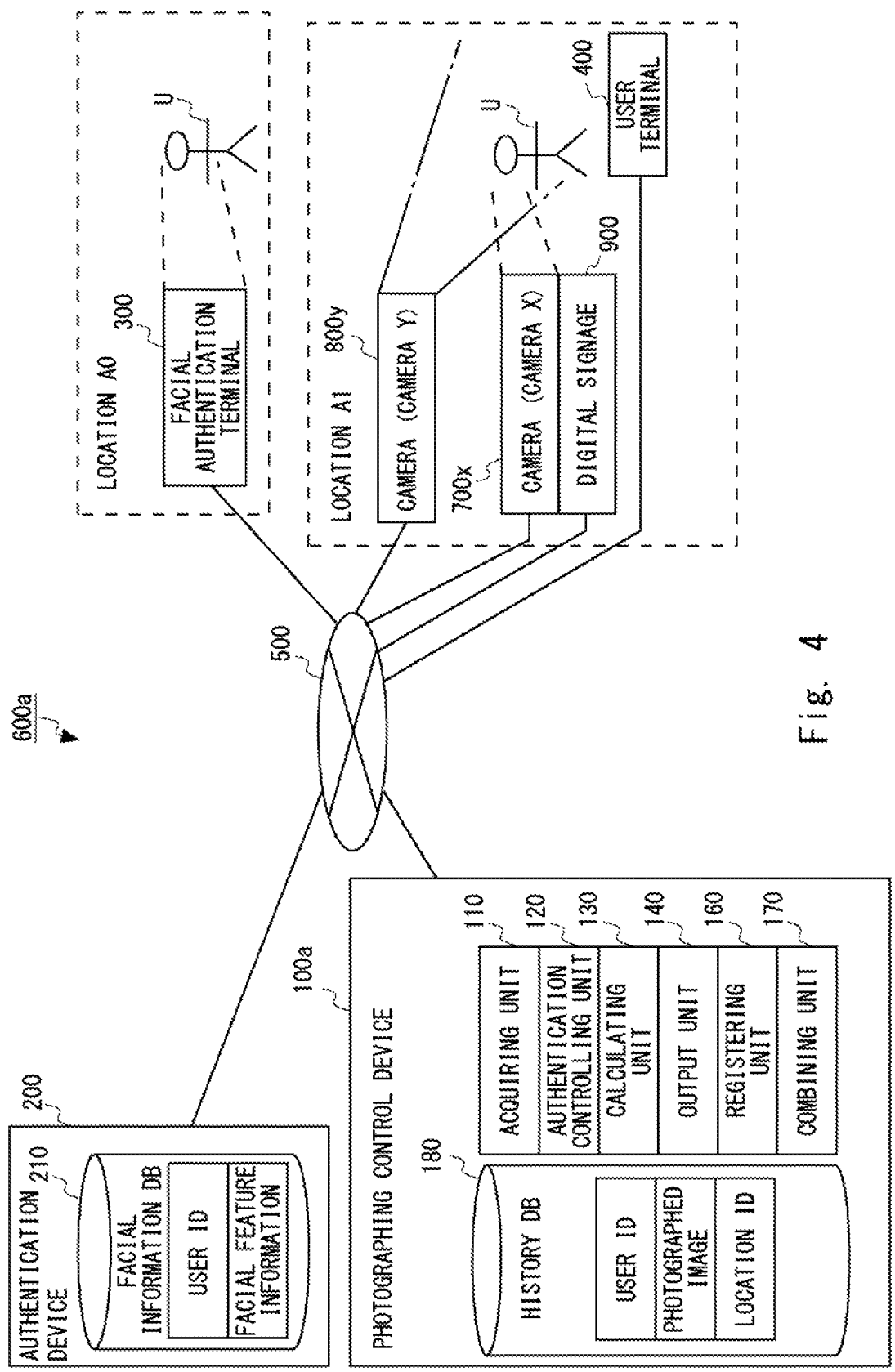
FIG. 4 is a block diagram illustrating a configuration of a photographing control system according to a third example embodiment.

A third example embodiment is a specific example of the first example embodiment described above. FIG. 4 is a block diagram illustrating a configuration of a photographing control system 600*a* according to the third example embodiment. The photographing control system 600*a* includes a photographing control device 100*a*, an authentication device 200, a facial authentication terminal 300, a camera 700*x*, a camera 800*y*, a digital signage 900, and a user terminal 400. The camera 700*x* is also referred to as a camera X. The camera 800*y* is also referred to as a camera Y. Herein, the user terminal 400 is not essential.

The photographing control device 100*a*, the authentication device 200, the facial authentication terminal 300, the camera 700*x*, the camera 800*y*, the digital signage 900, and the user terminal 400 are connected to each other via a network 500. According to the third example embodiment, facial feature information of a user U is registered in advance in the authentication device 200.

The photographing control device 100*a* includes a history DB 180, an acquiring unit 110, an authentication controlling unit 120, a calculating unit 130, an output unit 140, a registering unit 160, and a combining unit 170. The photographing control device 100*a* performs control for facial authentication of the user U and for commemorative photographing. Each function of the photographing control device 100*a* will be described later.

The authentication device 200 includes a facial feature DB 210. The facial feature DB 210 stores an association between the user ID and the facial feature information of the user. The facial feature DB 210 is also referred to as a storage unit. The authentication device 200, in response to receiving a facial authentication request from the outside, compares a facial image or facial feature information included in the received request against the facial feature information of the user and returns the result of the comparison to the requestor.

The facial authentication terminal 300 captures a registration image to be used for facial authentication of the user U. The facial authentication terminal 300 transmits the registration image to the authentication device 200 and makes a facial information registration request. The facial authentication terminal 300 is a device that registers facial feature information extracted from a user's facial image into the facial information DB 210 prior to commemorative photographing. The user U obtains a registration image captured at a location A0 where the facial authentication terminal 300 is installed. Herein, the user U may capture a registration image by use of the user terminal 400.

The camera 700*x*, the camera 800*y*, and the digital signage 900 are installed at a location A1. The assumption is that the user terminal 400 owned by the user U is also located at the location A1.

The camera 700*x* and the camera 800*y* are each a digital camera that photographs at least a region in which the user U is present and outputs the photographed image and the location ID to the photographing control device 100*a* via the network 500. The location ID is identification information for identifying the location A1 and may be identification information of the camera. The camera 700*x* and the camera 800*y* are controlled remotely by the photographing control device 100*a*.

The camera 800*y* is installed within a predetermined range from the camera 700*x* at the location A1. The camera 800*y* has a wider angle than the camera 700*x*. In other words, the camera 800*y* can photograph a range wider than the region to be photographed by camera 700*x*. For example, the camera 700*x* is attached to the digital signage 900, and the camera 800*y* is installed at a location away from the digital signage 900. Herein, the camera 800*y* may be installed close to the camera 700*x*.

A photographed image captured by the camera 700x is referred to as a first photographed image. A photographed image captured by the camera 800y is referred to as a second photographed image. A second photographed image is an image capturing a range wider than that of a first photographed image, as mentioned above. Herein, a first photographed image may be captured not by the camera 700x but by the user terminal 400. A first photographed image is also referred to below as a photographed image X. Meanwhile, a second photographed image is also referred to as a photographed image Y.

The digital signage 900 is controlled remotely by the photographing control device 100a and displays, on a screen, information received from the photographing control device 100a via the network 500. This information to be displayed includes a photographed image, a combined image described later, or a message. A message is, for example, guiding information stating, for example, "Please face the camera 800y." Herein, not the digital signage 900 but the user terminal 400 may receive and display information such as a photographed image.

Herein, the cameras 700x and 800y do not need to photograph a common region. In a case where the user U is in a region AX to be photographed by the camera 700x, the user U can be photographed by the camera 800y, for example, through the following procedures. First, the camera 700x photographs the user U. Next, the digital signage 900 displays a message stating "Please move into a region AY and face the camera 800y." After the user U has moved into the region AY, the camera 800y photographs the user U.

The user terminal 400 is an information processing terminal owned by the user U. The user terminal 400 is, for example but not limited to, a mobile phone terminal, a smartphone, a tablet terminal, or a personal computer (PC) equipped with or connected to a camera.

The user terminal 400 transmits, to the authentication device 200, a registration image to be used for facial authentication of the user U and makes a facial information registration request. Herein, it suffices that the photographing control system 600a include only one of the facial authentication terminal 300 or the user terminal 400 as a device for making a facial information registration request.

The user terminal 400 captures a first photographed image and transmits the first photographed image to the photographing control device 100a. Herein, it suffices that the photographing control system 600a include only one of the camera 700x or the user terminal 400 as a device for capturing a first photographed image.

The user terminal 400 receives information, such as a photographed image, from the photographing control device 100a. Herein, it suffices that the photographing control system 600a include only one of the digital signage 900 or the user terminal 400 as a display device that receives and displays information.

The user terminal 400, in place of the digital signage 900, may further display the success of failure of facial authentication or a message stating, for example, "Please face the camera Y." In particular, in a case where the user terminal 400 is used in place of the camera 700x, the photographing control system 600a can display a message and so forth on the user terminal 400. Herein, in a case where a first photographed image is captured by use of the camera 700x as well, the photographing control system 600a may display a message and so forth on the user terminal 400.

Figure 5:
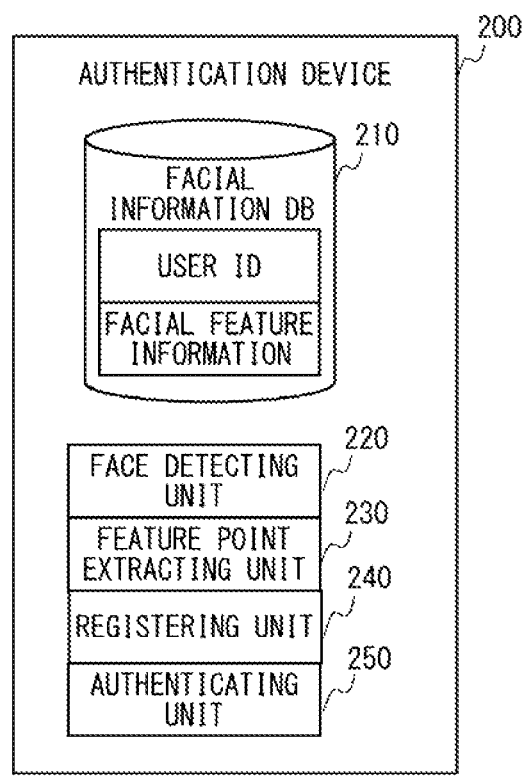
FIG. 5 is a block diagram illustrating a configuration of an authentication device according to the third example embodiment.

Next, some functions of the authentication device 200 will be described in detail. FIG. 5 is a block diagram illustrating a configuration of the authentication device 200.

The authentication device 200 includes the facial information DB 210 described earlier, a face detecting unit 220, a feature point extracting unit 230, a registering unit 240, and an authenticating unit 250.

The face detecting unit 220 detects a facial region included in a registration image for registering facial information and outputs the detected facial region to the feature point extracting unit 230. The feature point extracting unit 230 extracts feature points from the facial region detected by the face detecting unit 220 and outputs facial feature information to the registering unit 240. In this example, the facial feature information is a set of extracted feature points. The feature point extracting unit 230 also extracts feature points included in a facial image received from the photographing control device 100a and outputs facial feature information to the authenticating unit 250.

The registering unit 240 issues a new user ID when registering facial feature information. The registering unit 240 registers an association between the issued user ID and the facial feature information extracted from the registration image into the facial information DB 210. The authenticating unit 250 compares the facial feature information extracted from the facial image against the facial feature information in the facial information DB 210. The authenticating unit 250 returns, to the photographing control device 100a, the presence or absence of a match between the two pieces of facial feature information. The presence or absence of a match between the two pieces of facial feature information corresponds to the success or failure of the authentication.

Figure 8:
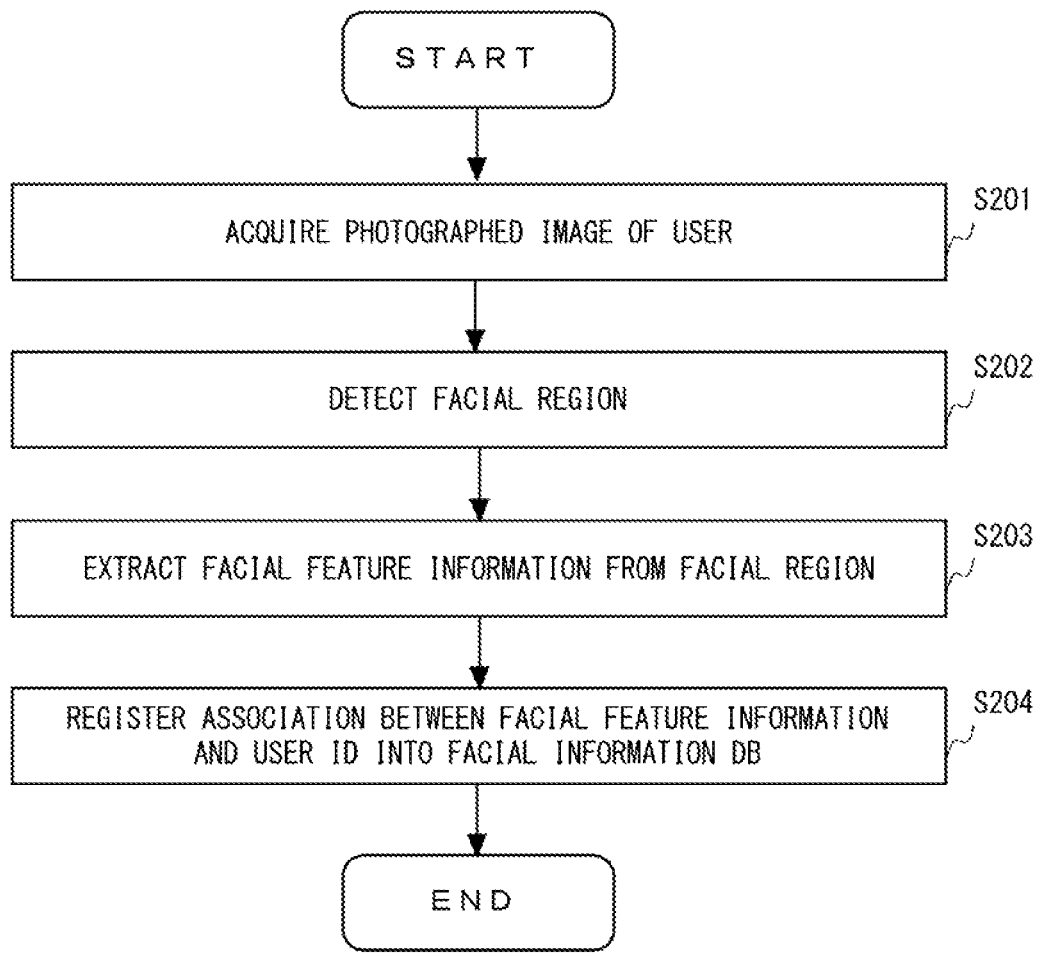
FIG. 8 is a flowchart illustrating a flow of a facial information registration process according to the third example embodiment.

FIG. 8 is a flowchart illustrating a flow of a facial information registration process performed by the authentication device 200. First, the authentication device 200 acquires a registration image included in a facial information registration request (step S201). For example, the authentication device 200 receives the facial information registration request from the facial authentication terminal 300 or the user terminal 400 via the network 500. Next, the face detecting unit 220 detects a facial region included in the registration image (step S202). Next, the feature point extracting unit 230 extracts feature points from the facial region detected at step S202 and outputs facial feature information to the registering unit 240 (step S203). Lastly, the registering unit 240 issues a user ID and registers an association between this user ID and the facial feature information into the facial information DB 210 (step S204). Thereafter, the authentication device 200 may return the result of the registration to the requestor.

Figure 9:
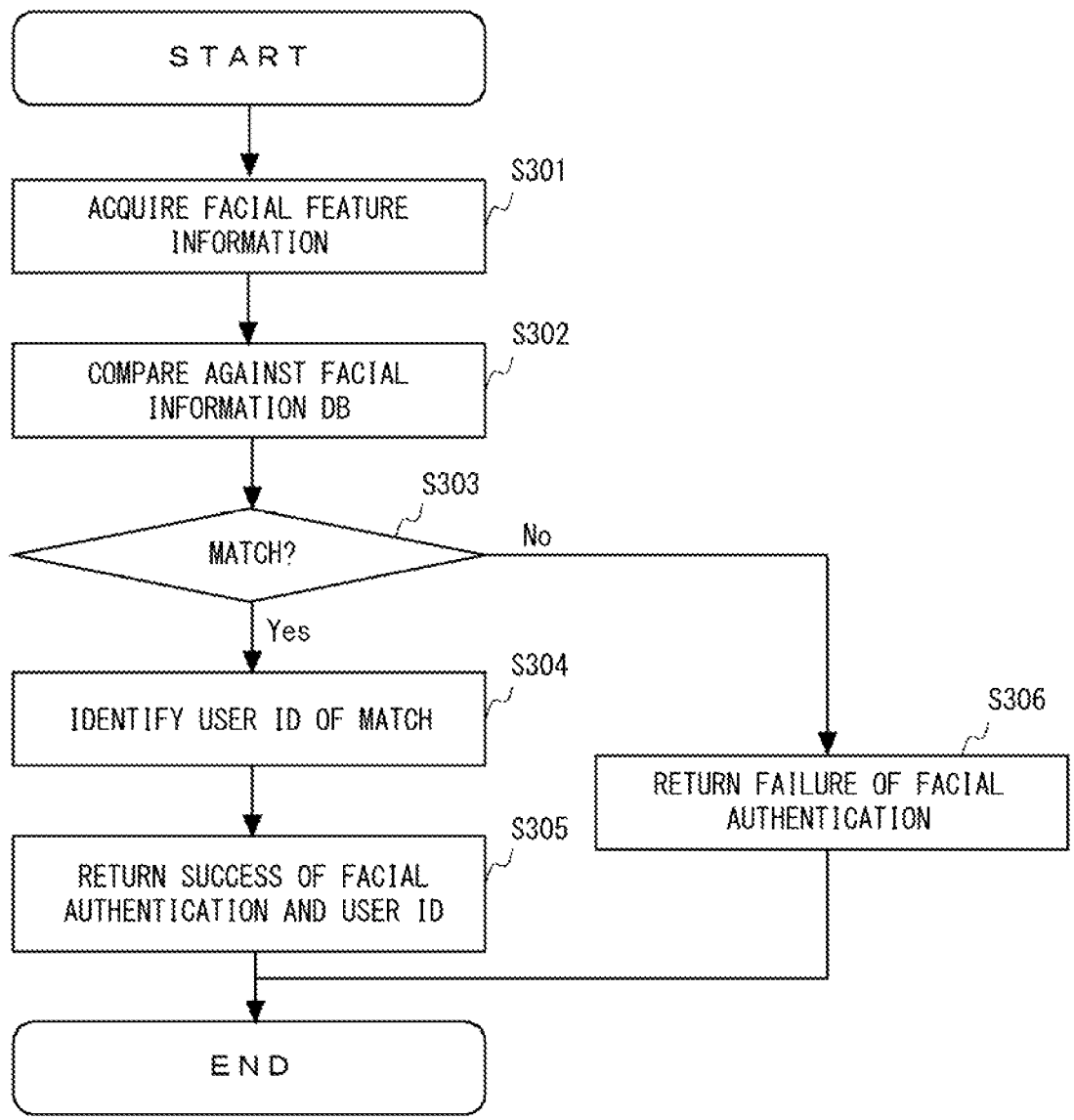
FIG. 9 is a flowchart illustrating a flow of a facial authentication process according to the third example embodiment.

FIG. 9 is a flowchart illustrating a flow of a facial authentication process performed by the authentication device 200. First, the feature point extracting unit 230 acquires facial feature information from a facial image received from the photographing control device 100a (step S301). For example, the authentication device 200 receives the facial image from the photographing control device 100a and extracts the facial feature information as in steps S201 to S203. Alternatively, the authentication device 200 may receive the facial feature information from the photographing control device 100a.

Next, the authenticating unit 250 compares the acquired facial feature information against the facial information DB 210 (step S302). If the facial feature information has a match (Yes at step S303), the authenticating unit 250 identifies the user ID of the user that the facial feature information has matched with (step S304) and returns the success of the facial authentication and the identified user ID to the photographing control device 100a (step S305). If the facial feature information has no match (No at step S303), the authenticating unit 250 returns the failure of the facial authentication to the photographing control device 100a (step S306).

Figure 6:
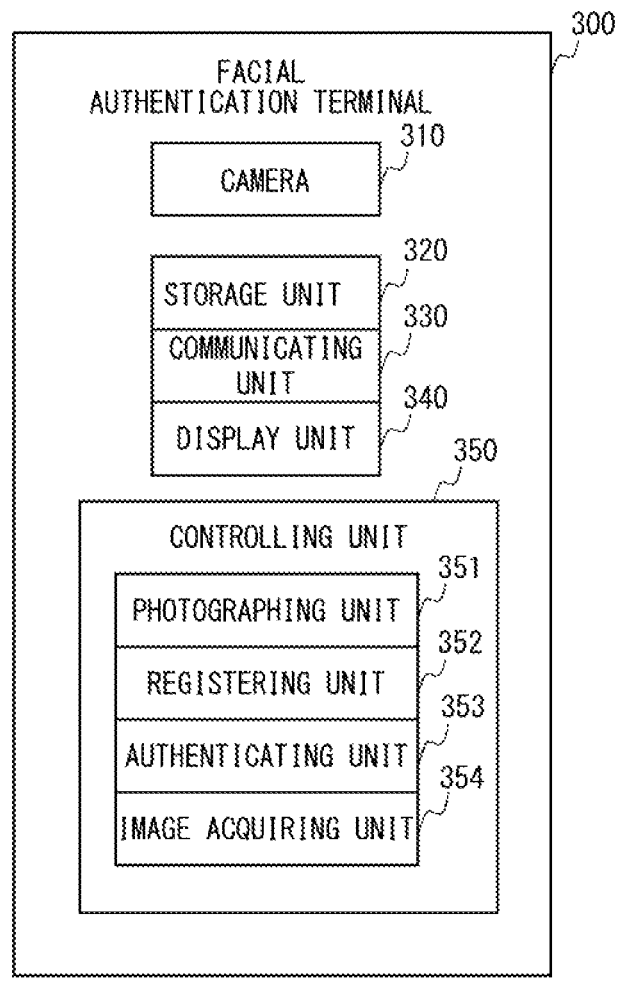
FIG. 6 is a block diagram illustrating a configuration of a facial authentication terminal according to the third example embodiment.

Next, the facial authentication terminal 300 will be described in detail. The facial authentication terminal 300 is an information processing device that performs a process of registering facial information. Herein, the facial authentication terminal 300 may include a function of, if a photographed image captured by the camera 700x or the camera 800y has been authenticated through facial authentication, acquiring and displaying this photographed image. The facial authentication terminal 300 includes, as its hardware components, a photographing device such as a camera, a display device, and a computer. FIG. 6 is a block diagram illustrating a configuration of the facial authentication terminal 300.

The facial authentication terminal 300 includes a camera 310 as mentioned above, a storage unit 320, a communicating unit 330, a display unit 340, and a controlling unit 350. The storage unit 320 is a storage device that stores a program for implementing each function of the facial authentication terminal 300. The communicating unit 330 is a communication interface with the network 500. The display unit 340 is the display device mentioned above and displays a photographed image of the user U. The controlling unit 350 controls hardware components of the facial authentication terminal 300. The controlling unit 350 includes a photographing unit 351, a registering unit 352, an authenticating unit 353, and an image acquiring unit 354.

The photographing unit 351 controls the camera 310 to obtain a registration image of the user. The registration image is an image that includes at least a facial image of the user. The registering unit 352 transmits a facial information registration request including the registration image to the authentication device 200 via the network 500. The authenticating unit 353 that performs facial authentication is not required according to the present example embodiment. The image acquiring unit 354 acquires a photographed image or a combined image described later from the photographing control device 100a. The facial authentication terminal 300 may be capable of displaying an acquired image on a screen of the display unit 340. Herein, the image acquiring unit 354 is not required according to the present example embodiment.

Figure 7:
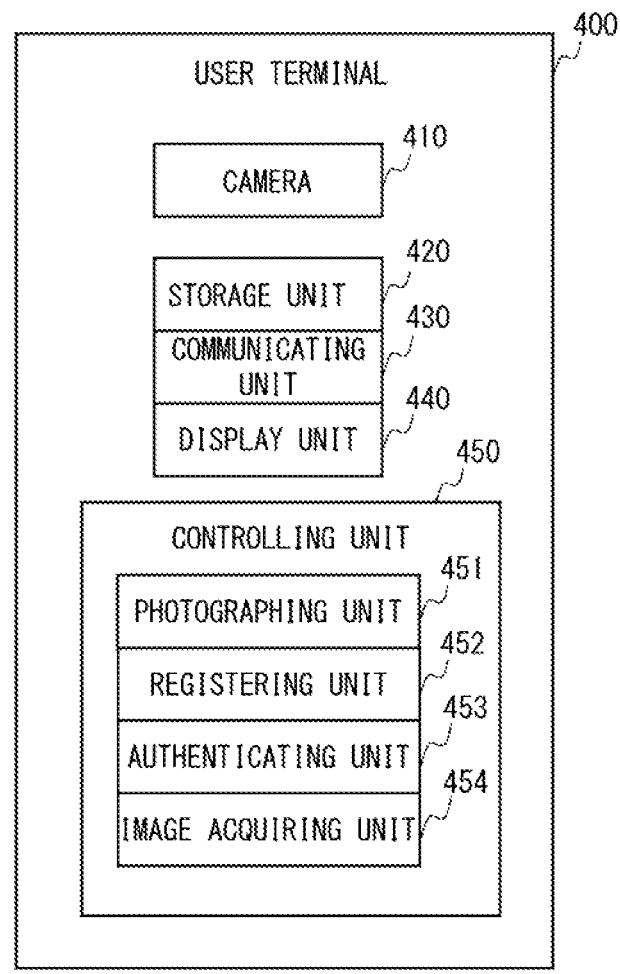
FIG. 7 is a block diagram illustrating a configuration of a user terminal according to the third example embodiment.

Next, the user terminal 400 will be described. The user terminal 400 is, for example, a mobile phone terminal owned by the user. FIG. 7 is a block diagram illustrating a configuration of the user terminal 400. Similarly to the facial authentication terminal 300, the user terminal 400 includes a camera 410, a storage unit 420, a communicating unit 430, and a display unit 440. The user terminal 400 further includes a controlling unit 450 that controls the aforementioned hardware components. Similarly to the controlling unit 350 of the facial authentication terminal 300, the controlling unit 450 includes a photographing unit 451, a registering unit 452, an authenticating unit 453, and an image acquiring unit 454. The photographing unit 451 may capture a photographed image X, in place of the camera 700x. The image acquiring unit 454 may display information received from the photographing control device 100a.

The facial authentication terminal 300 and the user terminal 400 each have a function of making a facial information registration request. A flow of a facial information registration process will be described below. Although the user terminal 400 is used in the case described below, a similar process may be performed by the facial authentication terminal 300.

The photographing unit 451 first controls the camera 410 to obtain a registration image of the user. It suffices that the registration image be an image that includes at least the face of the user. Next, the registering unit 452 transmits a facial information registration request including the registration image to the authentication device 200 via the network 500. Lastly, the registering unit 452 receives the result of the authentication from the authentication device 200.

Herein, the camera 700x may have a function of making a facial information registration request. In this case, the camera 700x needs to have a function similar to the function of the registering unit 452 described above. If the user finds the camera 700x at the location A1, the user can obtain a registration image on that spot.

Next, an authentication process performed by the user terminal 400 will be described. After the facial information has been registered, the user terminal 400 may photograph the user U, in place of the camera 700x. In this case, the authenticating unit 453 of the user terminal 400 acquires a photographed image X and makes an authentication request to the photographing control device 100a. Herein, in a case where the camera 700x is used, the user terminal 400 does not need to include the authenticating unit 453. The image acquiring unit 454 acquires a photographed image or a combined image described later from the photographing control device 100a via the network 500. The user terminal 400 displays the acquired image on the screen of the display unit 440.

Next, referring back to FIG. 4, some functions of the photographing control device 100a will be described. The photographing control device 100a is an information processing device that controls photographing performed by the camera 700x and the camera 800y and generates a combined image and is, for example, a server device implemented by a computer. As illustrated in FIG. 4, the photographing control device 100a includes the history DB 180, the acquiring unit 110, the authentication controlling unit 120, the calculating unit 130, the output unit 140, the registering unit 160, and the combining unit 170.

The history DB 180 is a database that manages history of locations that the user has actually visited and photographed images captured at these locations. The history DB 180 stores, for example, an association between the user ID, the photographed image, and the location ID.

The photographed image is, for example, an image that has been captured by the camera 700x or the camera 800y and includes at least the user U. Alternatively, the photographed image is a combined image of images captured by the camera 700x and the camera 800y. The location ID is information for identifying the installation location of the camera 700x or the like with which the user U has been authenticated successfully through facial authentication. Herein, the location ID may include information for identifying the installation location of the facial authentication terminal 300. The location ID is information for identifying, for example, the locations A0, A1, and so forth. Herein, in a case where the user terminal 400 is used in place of the camera 700x, the history DB 180 does not need to record the location ID. The photographing control system 600a may record the location ID based on position information from the GPS function of the user terminal 400. In the case described below, the camera 700x captures a photographed image X.

The acquiring unit 110 acquires photographed images and the installation locations (location ID) of the cameras from the camera 700x and the camera 800y via the network 500. Herein, the acquiring unit 110 may acquire identification information of the cameras from the camera 700x and the camera 800y.

The authentication controlling unit 120, in response to receiving a photographed image, transmits the photographed image to the authentication device 200 and causes the authentication device 200 to perform facial authentication. In this example, the authentication controlling unit 120 may transmit, in place of a photographed image, a facial image or its facial feature information to the authentication device 200. A facial image is an image of a facial region within a photographed image.

The authentication controlling unit 120 receives the result of authentication from the authentication device 200. The result of the authentication indicates whether the authentication has succeeded or failed. If the authentication has succeeded, the authentication device 200 transmits the user ID of the user who has been authenticated successfully. In this example, facial authentication of a photographed image X captured by the camera 700x is referred to as first facial authentication. Facial authentication of a photographed image Y captured by the camera 800y is referred to as second facial authentication.

If the first facial authentication has succeeded, the calculating unit 130 calculates the proportion, in the photographed image X, of the area of the facial region authenticated successfully in the first facial authentication. Then, the calculating unit 130 determines whether the calculated proportion is no smaller than a predetermined value. The predetermined value is, for example but not limited to, 30%. The output unit 140 outputs a message or a photographed image corresponding to the success or failure of first facial authentication, the success or failure of second facial authentication, and the result of the determination on the calculated proportion to the digital signage 900 via the network 500.

The registering unit 160 registers an association between the user ID, the photographed image X, and the location ID into the history DB 180, if the proportion calculated by the calculating unit 130 is smaller than the predetermined value. If the second facial authentication has succeeded, the registering unit 160 registers an association between the user ID, the photographed image Y, and the location ID into the history DB 180. Meanwhile, if the second facial authentication has failed, the registering unit 160 registers an association between the user ID, a combined image described later, and the location ID into the history DB 180. If the second facial authentication has failed, the combining unit 170 generates a first combined image combining the photographed image X and the photographed image Y.

Herein, in place of the camera 700x and the digital signage 900, the user terminal 400 may be used. In a case where the user terminal 400 is used in place of the camera 700x, the acquiring unit 110 acquires a photographed image X from the user terminal 400. Then, the output unit 140 outputs the photographed image to the user terminal 400.

Figure 10:
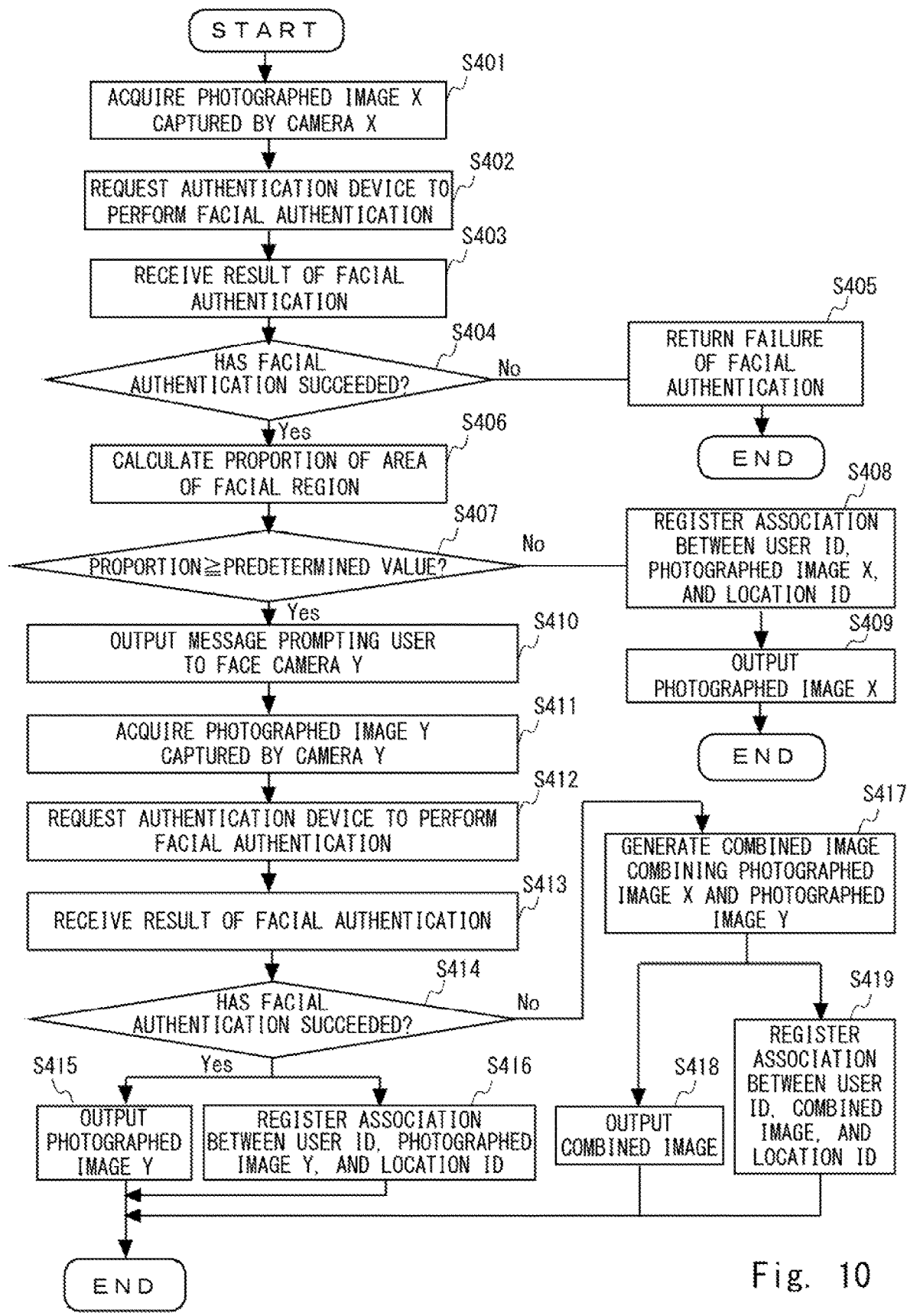
FIG. 10 is a flowchart illustrating a flow of a photographing control process according to the third example embodiment.

FIG. 10 is a flowchart illustrating a flow of a photographing control process. The assumption is that an association between the user ID and facial feature information of the user U is registered in the facial information DB 210 of the authentication device 200.

First, the acquiring unit 110 of the photographing control device 100a acquires a photographed image X from the camera 700x (step S401). Next, the authentication controlling unit 120 causes the authentication device 200 to perform facial authentication of the photographed image X (step S402) and receives the result of the facial authentication (step S403).

Next, the authentication controlling unit 120 determines whether the facial authentication has succeeded (step S404). For example, the authentication controlling unit 120 determines that the facial authentication has succeeded if the authentication controlling unit 120 has received the user ID as the result of the authentication or determines that the facial authentication has failed if the authentication controlling unit 120 has received the failure of the authentication.

If the facial authentication has failed (No at step S404), the output unit 140 returns the failure of the facial authentication (step S405). The output unit 140 may transmit the failure of the facial authentication to the digital signage 900. In this case, the digital signage 900 displays a message prompting the user U to take a photograph again.

If the facial authentication has succeeded (Yes at step S404), the calculating unit 130 calculates the proportion of the area of the facial region of the user U in the photographed image X (step S406) and determines whether the calculated proportion is greater than a predetermined value (step S407). If the calculated proportion is not greater than the predetermined value (No at step S407), the registering unit 160 registers an association between the user ID, the photographed image X, and the location ID into the history DB 180 (step S408). Then, the output unit 140 outputs the photographed image X (step S408). If the calculated proportion is no smaller than the predetermined value (Yes at step S407), the output unit 140 outputs a message prompting the user U to face the camera Y to the digital signage 900 (step S410). Then, the acquiring unit 110 acquires a photographed image Y by the camera Y (step S411).

Figure 11:
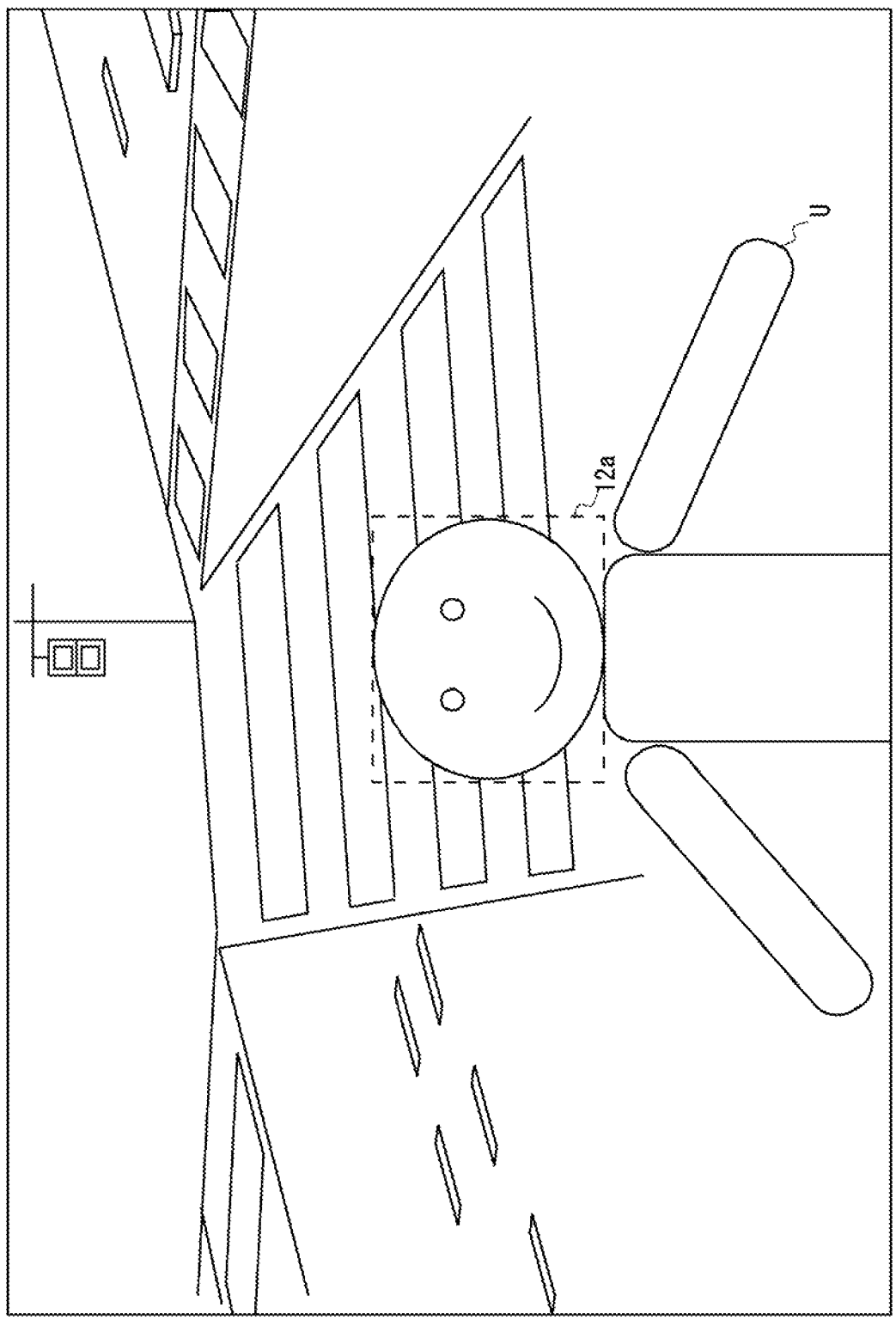
FIG. 11 illustrates a first example of a photographed image X according to the third example embodiment.
Figure 12:
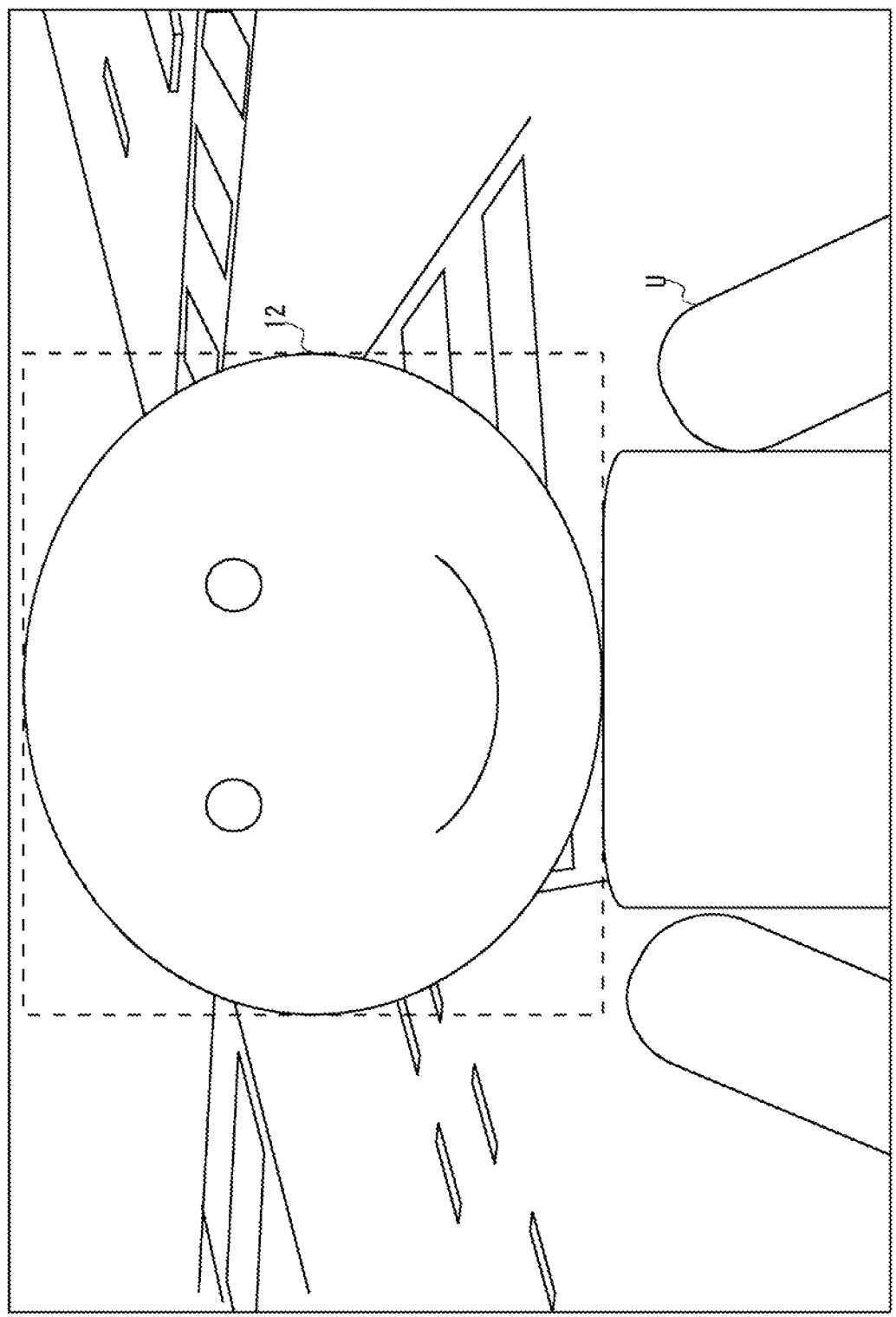
FIG. 12 illustrates a second example of a photographed image X according to the third example embodiment.

Steps S407 to S411 described above will be illustrated with a specific example. FIGS. 11 and 12 are examples of a photographed image X. The images both capture the user U. At step S407, the calculating unit 130 calculates the proportion of the area of a facial region 12 of the user U in the photographed image X. For example, the calculating unit 130 calculates the proportion of the area of the facial region 12 in the photographed image X illustrated in FIG. 11 to be 5%. For example, the calculating unit 130 calculates the proportion of the area of the facial region 12 in the photographed image X illustrated in FIG. 12 to be 33%.

The predetermined value used in the determination at step S407 is 30% in this example. If the photographed image X illustrated in FIG. 11 is acquired, the photographing control device 100a outputs the photographed image X at step S409 since the proportion of the area of the facial region does not exceed the predetermined value. Meanwhile, if the photographed image X illustrated in FIG. 12 is acquired, the photographing control device 100a outputs the photographed image Y captured by the camera Y at step S409 since the proportion of the area of the facial region exceeds the predetermined value.

Referring back to FIG. 10, the photographing control device 100a requests the authentication device 200 to perform facial authentication of the photographed image Y acquired at step S411 (S412). Next, the photographing control device 100a receives the result of the facial authentication (step S413) and determines whether the facial authentication has succeeded (step S414).

If the facial authentication has succeeded (Yes at step S414), the output unit 140 outputs the photographed image Y to the digital signage 900 or the like (step S415). Herein, the photographed image Y may be output, for example, to the user terminal 400 to which the user has logged in with his or her user ID or to the digital signage 900. The registering unit 160 registers an association between the user ID, the photographed image Y, and the location ID into the history DB 180 (step S416).

If the facial authentication has failed (No at step S414), the combining unit 170 of the photographing control device 100*a* generates a combined image combining the photographed image X and the photographed image Y through a known image combining technique (step S417). The combined image of the photographed image X and the photographed image Y is referred to as a first combined image.

Herein, the combining unit 170 of the photographing control device 100*a* may generate a first combined image also if the facial authentication has succeeded at step S414. For example, the combining unit 170 may generate a first combined image if the proportion of the area of the facial region in the photographed image Y is smaller than a predetermined value. In such a case, the photographing control device 100*a* can output only an image in which the proportion of the area of the facial region is sufficiently large. The predetermined value used in this case is referred to as a second proportion, and the predetermined value used at step S407 is referred to as a first proportion. The second proportion is smaller than the first proportion. For example, the first proportion is 30%, and the second proportion is 5%. The calculating unit 130 can calculate the second proportion in the same way as it calculates the first proportion.

The output unit 140 outputs the generated combined image to the digital signage 900 or the like (step S418). The registering unit 160 registers an association between the user ID, the combined image, and the location ID into the history DB 180 (step S419).

Figure 13:
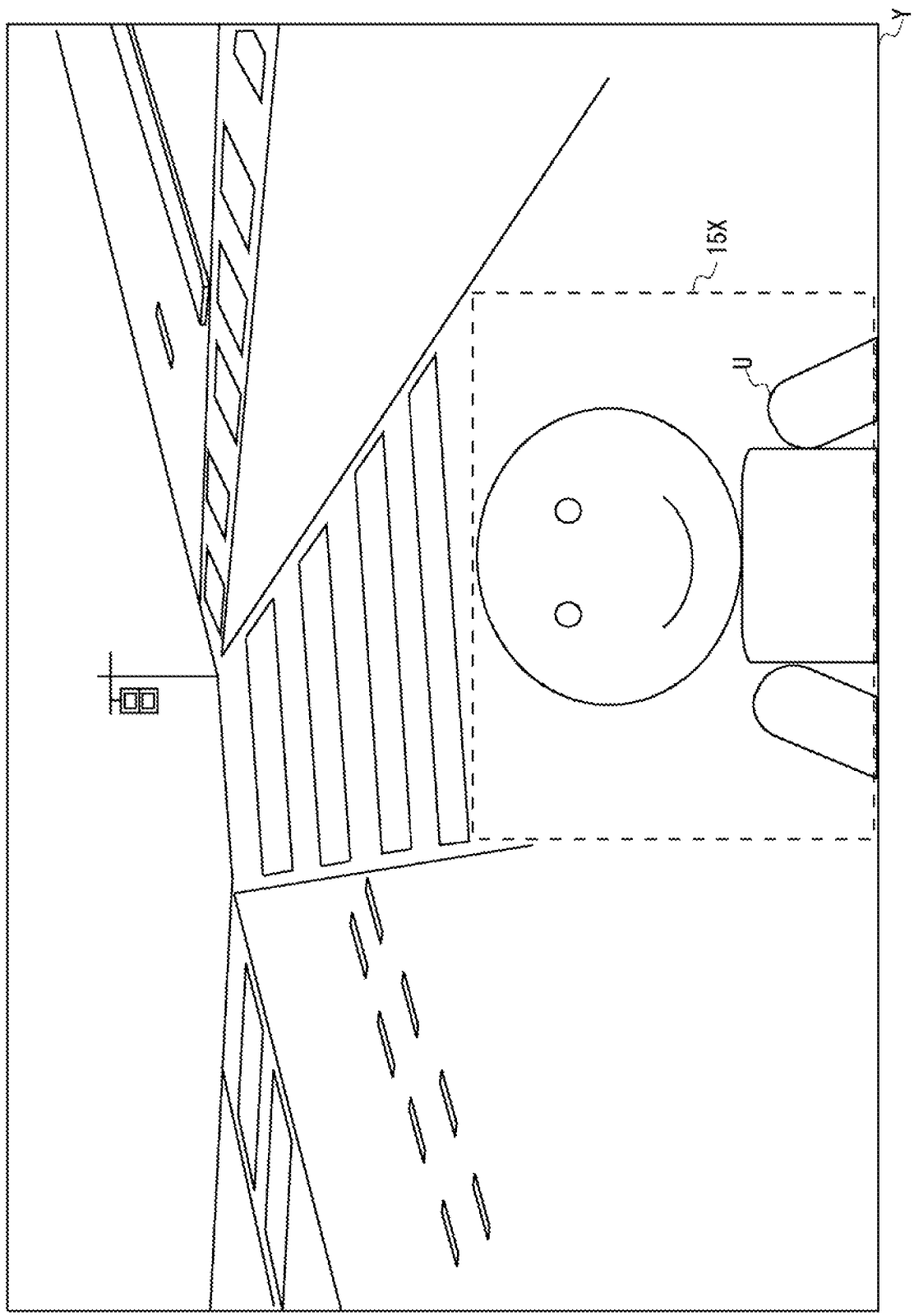
FIG. 13 illustrates an example of a first combined image according to the third example embodiment.

FIG. 13 is a schematic diagram illustrating an example of a combined image. The combined image illustrated in FIG. 13 is an image in which a photographed image Y and an image 15X including the user U are combined. The image 15X is a photographed image X captured by the camera X or an image obtained by cutting out a portion of a photographed image X. The image 15X may be an image obtained by trimming a photographed image X along the outline of the user U. A combined image includes the user U and the background captured in the photographed image Y and can thus be used as an image for commemorative photographing.

The photographing control device 100*a* according to the third example embodiment outputs a photographed image Y or a first combined image if the proportion of the area of the facial region of the user U in a photographed image X is no smaller than a predetermined value. Therefore, the photographing control device 100*a* can output an image for commemorative photographing capturing the user U and the background at a location A1.

Fourth Example Embodiment

In a photographing control system 600*b* according to a fourth example embodiment, a set including a camera X and a camera Y according to the third example embodiment is installed at a plurality of locations. The photographing control system 600*b* combines images associated with a plurality of locations and outputs a combined image. Such a combined image is referred to as a second combined image.

Figure 14:
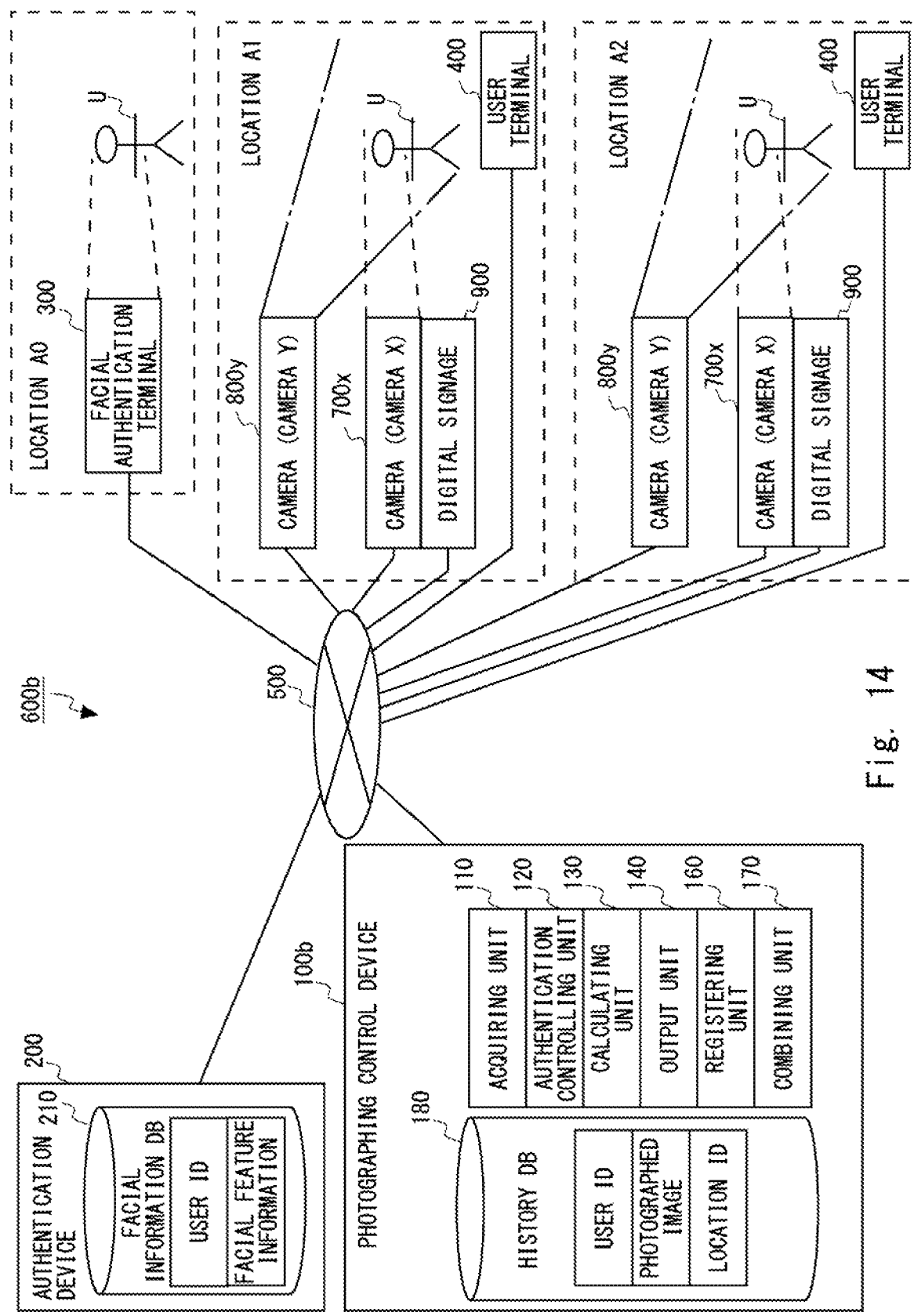
FIG. 14 is a block diagram illustrating a configuration of a photographing control system according to a fourth example embodiment.

FIG. 14 is a block diagram illustrating a configuration of the photographing control system 600*b*. A photographing control device 100*b*, an authentication device 200, a facial authentication terminal 300, user terminals 400, cameras 700*x*, cameras 800*y*, and digital signages 900 are connected to each other via a network 500, as in the third example embodiment.

A set including a camera 700*x*, a camera 800*y*, and a digital signage 900 is installed at each of a location A1 and a location A2. For example, the location A1 and the location A2 are destinations in a point rally. Herein, a set including a camera 700*x*, a camera 800*y*, and a digital signage 900 may be installed at three or more locations.

According to the fifth example embodiment, the camera 700*x* captures a photographed image X. The digital signage 900 or the user terminal 400 displays an output image. Therefore, the user terminal 400 is optional according to the fourth example embodiment. The functions of the authentication device 200, the facial authentication terminal 300, the user terminals 400, the cameras 700*x*, the cameras 800*y*, and the digital signages 900 are similar to those according to the third example embodiment, and thus description thereof will be omitted.

The photographing control device 100*b* includes an acquiring unit 110, an authentication controlling unit 120, a calculating unit 130, an output unit 140, a registering unit 160, a combining unit 170, and a history DB 180. The functions of the acquiring unit 110, the authentication controlling unit 120, the calculating unit 130, and the registering unit 160 are similar to those according to the third example embodiment, and thus description thereof will be omitted.

The history DB 180 is a database that manages history of a plurality of locations that the user U has visited and images captured at these visited locations. The visited locations include the location A1 and the location A2 where a set including a camera 700*x* and a camera 800*y* is installed. Herein, the history DB 180 may store a location A0 and an image captured at the location A0. The image captured at the location A0 is a registration image for authentication captured by the facial authentication terminal 300.

If the authentication controlling unit 120 has succeeded in facial authentication of the user U, the combining unit 170 refers to the history DB 180 and determines whether two or more locations are associated with the user ID for which the facial authentication has succeeded. If two or more locations are associated with the user ID, the combining unit 170 acquires images associated with the user ID from the history DB 180 and generates a second combined image combining the acquired images. The combining unit 170 may generate a second combined image, for example, if the first facial authentication has succeeded at the location A2.

Figure 16:
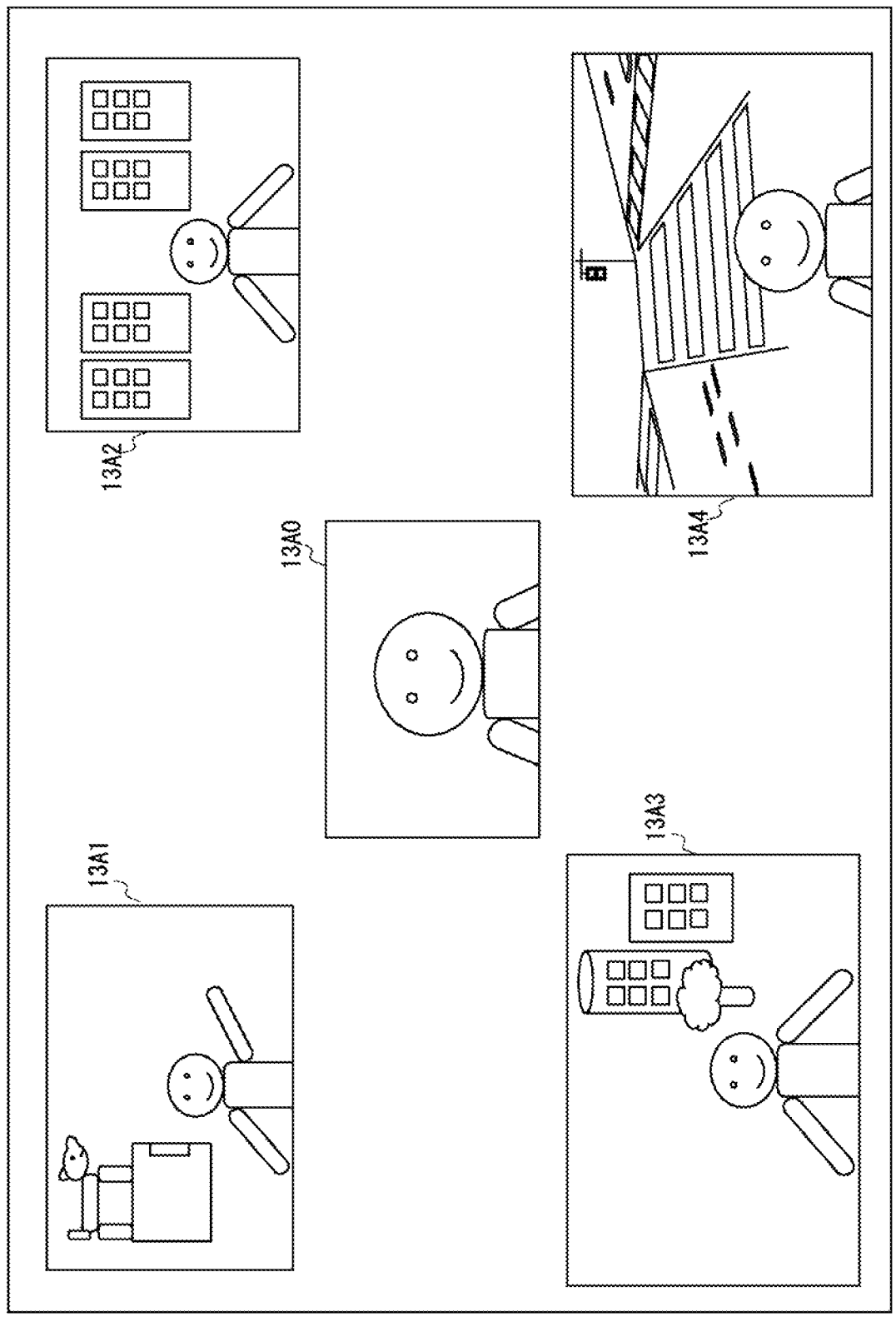
FIG. 16 illustrates an example of a second combined image according to the fourth example embodiment.

FIG. 16 is a schematic diagram illustrating an example of a second combined image. FIG. 16 is a combined image to be obtained in a case where a point rally has four locations to visit, namely, A1, A2, A3, and A4. In this case, the second combined image is generated, for example, when the first facial authentication has succeeded at the location A4, which is the fourth location to visit.

The combined image illustrated in FIG. 16 is an image obtained by combining images 13A1, 13A2, 13A3, 13A4, and 13A0. The images 13A1, 13A2, 13A3, 13A4, and 13A0 are images associated with the user U in the history DB 180. The image 13A1 is, among the images associated with the user U, an image associated with the location A1. As described according to the third example embodiment, the image 13A1 can be a photographed image X captured by the camera 700*x*, a photographed image Y captured by the camera 800*y*, or a first combined image of photographed images X and Y, depending on the result of authentication performed at the time of photographing.

In a similar manner, the image 13A2 is an image associated with the location A2 in the history DB 180. The images 13A3 and 13A4 are images associated with, respectively, locations A3 and A4, which are not illustrated in FIG. 14. The image 13A0 is a registration image for facial authentication captured at the location A0. Herein, the second combined image does not need to include the image 13A0 for facial authentication.

The positions of the images 13A0 to 13A4 in the second combined image may be determined in accordance with not only the locations where these images are captured but also the proportion of the area of the facial region in each of the images 13A0 to 13A4. The images 13A0 to 13A4 can be arranged in accordance with the proportion of the area of the facial region through, for example, either of the following methods A and B. (A) An image in which the proportion of the area of the facial region is greater is placed closer to the center of the second combined image. (B) An image in which the proportion of the area of the facial region is smaller is placed closer to the center of the second combined image.

When a plurality of images are laid out, one or more of the plurality of images may be placed at the center as a main image or main images. In this case, a main image may have a size greater than the size of a sub-image other than the main image. In the case illustrated in FIG. 16, the image 13A0 is a main image, and the images 13A1 to 13A4 are sub-images. The image 13A0 may have a size greater than the sizes of the images 13A1 to 13A4.

In a case where the method A is employed, an image with the greatest proportion of the area of the facial region can serve as a main image in a second combined image. Meanwhile, in a case where the method B is employed, an image with the smallest proportion of the area of the facial region serves as a main image. The method B is considered to be effective since, when the size of a main image is sufficiently greater than the size of a sub-image, the face can be recognized even in an image in which the proportion of the area of the facial region is small.

Figure 15:
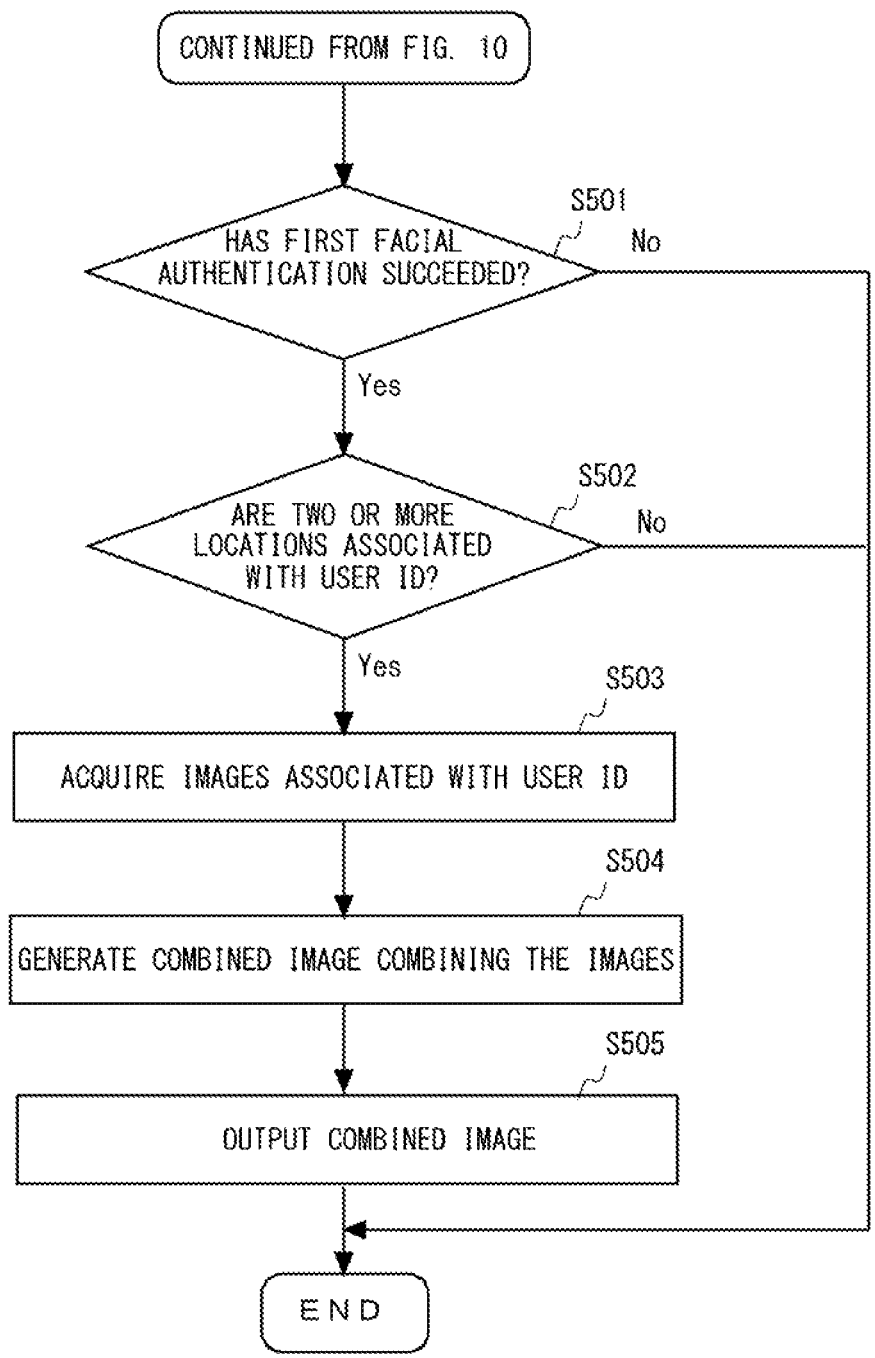
FIG. 15 is a flowchart illustrating a flow of a process of generating a second combined image according to the fourth example embodiment.

FIG. 15 is a flowchart illustrating an example of a flow of a combined image generation process performed by the combining unit 170. FIG. 15 illustrates a process continuing from the image registration process illustrated in FIG. 10. FIG. 15 illustrates a process performed, for example, after facial authentication of a photographed image X captured at the location A4 has been performed after the process of registering an image captured at the location A3.

If the authentication controlling unit 120 has succeeded in first facial authentication of a photographed image X (Yes at step S501), the combining unit 170 determines whether two or more location IDs are associated with the user ID (step S502).

If two or more location IDs are associated with the user ID (Yes at step S502), the combining unit 170 acquires images associated with the user ID (step S503). In the case illustrated in FIG. 16, the combining unit 170 acquires the images 13A1, 13A2, 13A3, and 13A4. The combining unit 170 may further acquire the image 13A0.

Next, the combining unit 170 combines the plurality of images acquired at step S503 and generates a second combined image (step S504). In this example, the second combined image may include information pertaining to the visited locations, information indicating the times of the visits, or user information. The information pertaining to a visited location indicates, for example, the name of the visited location, and the user information indicates, for example, the name of the user. Here, information such as a location name needs to be stored while being associated with a location ID or the like. The information indicating the time of a visit indicates, for example, the time when the photographed image was captured. The history DB 180 may store an association between the user ID, the photographed image, the location ID, and the information indicating the time of the visit. Lastly, the output unit 140 outputs the generated second combined image to the digital signage 900 or the user terminal 400 (step S505).

In the example described herein, a second combined image is generated if first facial authentication has succeeded. Alternatively, the combining unit 170 may generate a second combined image if second facial authentication has succeeded. The combining unit 170 may generate a second combined image if the user terminal 400 or the like has succeeded in facial authentication of the user U, after the point rally has ended.

The present example embodiment allows the user to acquire a combined image confirming that the user has visited a plurality of locations. Since the photographed images captured at the respective locations each include the background and the user, the user can use a combined image as a commemorative picture.

The foregoing example embodiments have been described as hardware configurations, but these are not limiting examples. The present disclosure can also be implemented via desired processes by causing a CPU to execute a computer program.

In the foregoing examples, a program can be stored and provided to a computer by use of various types of non-transitory computer-readable media. Non-transitory computer-readable media include various types of tangible storage media. Examples of such non-transitory computer-readable media include a magnetic recording medium (e.g., flexible disk, magnetic tape, hard-disk drive), a magneto-optical recording medium (e.g., magneto-optical disk), a CD-ROM (read-only memory), a CD-R, a CD-R/W, a DVD (digital versatile disc), and a semiconductor memory (e.g., mask ROM, PROM (programmable ROM), EPROM (erasable PROM), flash ROM, RAM (random-access memory)). Meanwhile, a program may be supplied to a computer by use of various types of transitory computer-readable media. Examples of such transitory computer-readable media include an electric signal, an optical signal, and an electromagnetic wave. A transitory computer-readable medium can supply a program to a computer via a wired communication line, such as an electric wire or an optical fiber, or via a wireless communication line.

It is to be noted that the present disclosure is not limited to the foregoing example embodiments, and modifications can be made, as appropriate, within the scope that does not depart from the technical spirit. The present disclosure may also be implemented by combining the example embodiments, as appropriate.

A part or the whole of the foregoing example embodiments can also be expressed as in the following supplementary notes, which are not limiting.

(Supplementary Note 1)

A photographing control device comprising:

first acquiring means for acquiring a first photographed image capturing a person and obtained by a first photographing device installed at a predetermined location;

first authentication controlling means for causing an authentication device storing an association between identification information and facial feature information of a predetermined person to perform first facial authentication of the first photographed image by use of the facial feature information;

calculating means for calculating, if the first facial authentication has succeeded, a proportion, in the first photographed image, of an area of a facial region authenticated successfully in the first facial authentication;

second acquiring means for acquiring a second photographed image capturing the person and obtained by a second photographing device installed within a predetermined range from the first photographing device at the predetermined location and having a wider angle than that of the first photographing device, if the proportion is no smaller than a predetermined value;

second authentication controlling means for causing the authentication device to perform second facial authentication of the second photographed image by use of the facial feature information; and output means for outputting the second photographed image, if the second facial authentication has succeeded.

(Supplementary Note 2)

The photographing control device according to Supplementary Note 1, further comprising registering means for registering an association between the second photographed image and the identification information into a predetermined storage device, if the second facial authentication has succeeded.

(Supplementary Note 3)

The photographing control device according to Supplementary Note 2, wherein the registering means registers an association of the predetermined location with the identification information and the second photographed image into the storage device, if either one of the first facial authentication or the second facial authentication has succeeded.

(Supplementary Note 4)

The photographing control device according to Supplementary Note 2 or 3, further comprising first combining means for generating a first combined image combining the first photographed image and the second photographed image, if the second facial authentication has failed, wherein the registering means further registers an association between the first combined image and the identification information into the storage device, if the second facial authentication has failed, and the output means outputs the first combined image.

(Supplementary Note 5)

The photographing control device according to any one of Supplementary Notes 2 to 4, wherein a set including the first photographing device and the second photographing device is installed at a plurality of different locations, the photographing control device further comprises second combining means for acquiring two or more images associated with the identification information from the storage device and generating a second combined image including the two or more images, if two or more locations are associated with the identification information in the storage device, and the output means outputs the second combined image.

(Supplementary Note 6)

A photographing control device comprising:

storing means for storing an association between identification information and facial feature information of a predetermined person;

first acquiring means for acquiring a first photographed image capturing a person and obtained by a first photographing device installed at a predetermined location;

first authenticating means for performing first facial authentication of the first photographed image by use of the facial feature information;

calculating means for calculating, if the first facial authentication has succeeded, a proportion, in the first photographed image, of an area of a facial region authenticated successfully in the first facial authentication;

second acquiring means for acquiring a second photographed image capturing the person and obtained by a second photographing device installed within a predetermined range from the first photographing device at the predetermined location and having a wider angle than that of the first photographing device, if the proportion is no smaller than a predetermined value;

second authenticating means for performing second facial authentication of the second photographed image by use of the facial feature information; and an output means for outputting the second photographed image, if the second facial authentication has succeeded.

(Supplementary Note 7)

The photographing control device according to Supplementary Note 6, further comprising registering means for registering an association between the second photographed image and the identification information into a predetermined storage device, if the second facial authentication has succeeded.

(Supplementary Note 8)

A photographing control system comprising:

a first photographing device installed at a predetermined location;

a second photographing device installed within a predetermined range from the first photographing device at the predetermined location and having a wider angle than that of the first photographing device;

an authentication device including storing means configured to store an association between identification information and facial feature information of a predetermined person and authenticating means configured to perform facial authentication by use of the facial feature information; and a photographing control device, wherein the photographing control device is configured to
acquire a first photographed image obtained by the first photographing device and capturing a person,
cause first facial authentication of the first photographed image to be performed by use of the facial feature information,
calculate, if the first facial authentication has succeeded, a proportion, in the first photographed image, of an area of a facial region authenticated successfully in the first facial authentication,
acquire a second photographed image obtained by the second photographing device and capturing the person, if the proportion is no smaller than a predetermined value,
cause second facial authentication of the second photographed image to be performed by use of the facial feature information, and
output the second photographed image, if the second facial authentication has succeeded.

(Supplementary Note 9)

The photographing control system according to Supplementary Note 8, wherein the photographing control device is configured to register an association between the second photographed image and the identification information into a predetermined storage device, if the second facial authentication has succeeded.

(Supplementary Note 10)

A photographing control method comprising:
- acquiring a first photographed image capturing a person and obtained by a first photographing device installed at a predetermined location;
- causing an authentication device storing an association between identification information and facial feature information of a predetermined person to perform first facial authentication of the first photographed image by use of the facial feature information;
- calculating, if the first facial authentication has succeeded, a proportion, in the first photographed image, of an area of a facial region authenticated successfully in the first facial authentication;
- acquiring a second photographed image capturing the person and obtained by a second photographing device installed within a predetermined range from the first photographing device at the predetermined location and having a wider angle than that of the first photographing device, if the proportion is no smaller than a predetermined value;
- causing the authentication device to perform second facial authentication of the second photographed image by use of the facial feature information; and
- outputting the second photographed image, if the second facial authentication has succeeded.

(Supplementary Note 11)

A photographing control method executed by a computer configured to store an association between identification information and facial feature information of a predetermined person, the photographing control method comprising:
- acquiring a first photographed image capturing a person and obtained by a first photographing device installed at a predetermined location;
- performing first facial authentication of the first photographed image by use of the facial feature information;
- calculating, if the first facial authentication has succeeded, a proportion, in the first photographed image, of an area of a facial region authenticated successfully in the first facial authentication;
- acquiring a second photographed image capturing the person and obtained by a second photographing device installed within a predetermined range from the first photographing device at the predetermined location and having a wider angle than that of the first photographing device, if the proportion is no smaller than a predetermined value;
- performing second facial authentication of the second photographed image by use of the facial feature information; and
- outputting the second photographed image, if the second facial authentication has succeeded.

(Supplementary Note 12)

A non-transitory computer-readable medium storing a photographing control program that causes a computer to execute:
- a process of acquiring a first photographed image capturing a person and obtained by a first photographing device installed at a predetermined location;
- a process of causing an authentication device storing an association between identification information and facial feature information of a predetermined person to perform first facial authentication of the first photographed image by use of the facial feature information;
- a process of calculating, if the first facial authentication has succeeded, a proportion, in the first photographed image, of an area of a facial region authenticated successfully in the first facial authentication;
- a process of acquiring a second photographed image capturing the person and obtained by a second photographing device installed within a predetermined range from the first photographing device at the predetermined location and having a wider angle than that of the first photographing device, if the proportion is no smaller than a predetermined value;
- a process of causing the authentication device to perform second facial authentication of the second photographed image by use of the facial feature information; and
- a process of outputting the second photographed image, if the second facial authentication has succeeded.

(Supplementary Note 13)

A non-transitory computer-readable medium storing a photographing control program that causes a computer configured to store an association between identification information and facial feature information of a predetermined person to execute:
- a process of acquiring a first photographed image capturing a person and obtained by a first photographing device installed at a predetermined location;
- a process of performing first facial authentication of the first photographed image by use of the facial feature information;
- a process of calculating, if the first facial authentication has succeeded, a proportion, in the first photographed image, of an area of a facial region authenticated successfully in the first facial authentication;
- a process of acquiring a second photographed image capturing the person and obtained by a second photographing device installed within a predetermined range from the first photographing device at the predetermined location and having a wider angle than that of the first photographing device, if the proportion is no smaller than a predetermined value;
- a process of performing second facial authentication of the second photographed image by use of the facial feature information; and
- a process of outputting the second photographed image, if the second facial authentication has succeeded.

REFERENCE SIGNS LIST 100, 100a, 100b PHOTOGRAPHING CONTROL DEVICE
110 ACQUIRING UNIT
111 FIRST ACQUIRING UNIT
112 SECOND ACQUIRING UNIT
120 AUTHENTICATION CONTROLLING UNIT
121 FIRST AUTHENTICATION CONTROLLING UNIT
121a FIRST AUTHENTICATING UNIT
122 SECOND AUTHENTICATION CONTROLLING UNIT
122a SECOND AUTHENTICATING UNIT
130 CALCULATING UNIT
140 OUTPUT UNIT

150 STORAGE UNIT
160 REGISTERING UNIT
170 COMBINING UNIT
180 HISTORY DB
200 AUTHENTICATION DEVICE
210 FACIAL INFORMATION DB
220 FACE DETECTING UNIT
230 FEATURE POINT EXTRACTING UNIT
240 REGISTERING UNIT
250 AUTHENTICATING UNIT
300 FACIAL AUTHENTICATION TERMINAL
310 CAMERA
320 STORAGE UNIT
330 COMMUNICATING UNIT
340 DISPLAY UNIT
350 CONTROLLING UNIT
351 PHOTOGRAPHING UNIT
352 REGISTERING UNIT
353 AUTHENTICATING UNIT
354 IMAGE ACQUIRING UNIT
400 USER TERMINAL
410 CAMERA
420 STORAGE UNIT
430 COMMUNICATING UNIT
440 DISPLAY UNIT
450 CONTROLLING UNIT
451 PHOTOGRAPHING UNIT
452 REGISTERING UNIT
453 AUTHENTICATING UNIT
454 IMAGE ACQUIRING UNIT
500 NETWORK
600, 600a, 600b PHOTOGRAPHING CONTROL SYSTEM
700 FIRST PHOTOGRAPHING DEVICE
700x CAMERA
800 SECOND PHOTOGRAPHING DEVICE
800y CAMERA
900 DIGITAL SIGNAGE

What is claimed is:

1. A photographing control device comprising:
at least one memory storing instructions; and
at least one processor configured to execute the instructions to:
acquire a first photographed image capturing a person and obtained by a first photographing device installed at a predetermined location;
cause an authentication device storing an association between identification information and facial feature information of a predetermined person to perform first facial authentication of the first photographed image by use of the facial feature information;
calculate, if the first facial authentication has succeeded, a proportion, in the first photographed image, of an area of a facial region authenticated successfully in the first facial authentication;
acquire a second photographed image capturing the person and obtained by a second photographing device installed within a predetermined range from the first photographing device at the predetermined location and having a wider angle than that of the first photographing device, if the proportion is no smaller than a predetermined value;
cause the authentication device to perform second facial authentication of the second photographed image by use of the facial feature information;
output the second photographed image, if the second facial authentication has succeeded; and
register an association between the second photographed image and the identification information into a predetermined storage device, if the second facial authentication has succeeded.

2. The photographing control device according to claim 1, wherein the at least one processor is further configured to execute the instructions to:
register an association of the predetermined location with the identification information and the second photographed image into the storage device, if either one of the first facial authentication or the second facial authentication has succeeded.

3. The photographing control device according to claim 1, wherein the at least one processor is further configured to execute the instructions to:
generate a first combined image combining the first photographed image and the second photographed image, if the second facial authentication has failed,
register an association between the first combined image and the identification information into the storage device, if the second facial authentication has failed, and
output the first combined image.

4. The photographing control device according to claim 1, wherein
a set including the first photographing device and the second photographing device is installed at a plurality of different locations, and the at least one processor is further configured to execute the instructions to:
acquire two or more images associated with the identification information from the storage device and generate a second combined image including the two or more images, if two or more locations are associated with the identification information in the storage device, and
output the second combined image.

5. A photographing control device comprising:
at least one memory storing instructions and
an association between identification information and facial feature information of a predetermined person; and
at least one processor configured to execute the instructions to:
acquire a first photographed image capturing a person and obtained by a first photographing device installed at a predetermined location;
perform first facial authentication of the first photographed image by use of the facial feature information;
calculate, if the first facial authentication has succeeded, a proportion, in the first photographed image, of an area of a facial region authenticated successfully in the first facial authentication;
acquire a second photographed image capturing the person and obtained by a second photographing device installed within a predetermined range from the first photographing device at the predetermined location and having a wider angle than that of the first photographing device, if the proportion is no smaller than a predetermined value;
perform second facial authentication of the second photographed image by use of the facial feature information;
output the second photographed image, if the second facial authentication has succeeded; and
register an association between the second photographed image and the identification information into a predetermined storage device, if the second facial authentication has succeeded.

6. A photographing control system comprising:
a first photographing device installed at a predetermined location;
a second photographing device installed within a predetermined range from the first photographing device at the predetermined location and having a wider angle than that of the first photographing device;
an authentication device including storing means configured to store an association between identification information and facial feature information of a predetermined person and authenticating means configured to perform facial authentication by use of the facial feature information; and
a photographing control device,
wherein the photographing control device is configured to
acquire a first photographed image obtained by the first photographing device and capturing a person,
cause first facial authentication of the first photographed image to be performed by use of the facial feature information,
calculate, if the first facial authentication has succeeded, a proportion, in the first photographed image, of an area of a facial region authenticated successfully in the first facial authentication,
acquire a second photographed image obtained by the second photographing device and capturing the person, if the proportion is no smaller than a predetermined value,
cause second facial authentication of the second photographed image to be performed by use of the facial feature information,
output the second photographed image, if the second facial authentication has succeeded, and
register an association between the second photographed image and the identification information into a predetermined storage device, if the second facial authentication has succeeded.

7. The photographing control system according to claim 6, wherein the photographing control device is configured to register an association between the second photographed image and the identification information into a predetermined storage device, if the second facial authentication has succeeded.

8. A photographing control method comprising:
acquiring a first photographed image capturing a person and obtained by a first photographing device installed at a predetermined location;
causing an authentication device storing an association between identification information and facial feature information of a predetermined person to perform first facial authentication of the first photographed image by use of the facial feature information;
calculating, if the first facial authentication has succeeded, a proportion, in the first photographed image, of an area of a facial region authenticated successfully in the first facial authentication;
acquiring a second photographed image capturing the person and obtained by a second photographing device installed within a predetermined range from the first photographing device at the predetermined location and having a wider angle than that of the first photographing device, if the proportion is no smaller than a predetermined value;
causing the authentication device to perform second facial authentication of the second photographed image by use of the facial feature information;
outputting the second photographed image, if the second facial authentication has succeeded; and
register an association between the second photographed image and the identification information into a predetermined storage device, if the second facial authentication has succeeded.

9. A photographing control method executed by a computer configured to store an association between identification information and facial feature information of a predetermined person, the photographing control method comprising:
acquiring a first photographed image capturing a person and obtained by a first photographing device installed at a predetermined location;
performing first facial authentication of the first photographed image by use of the facial feature information;
calculating, if the first facial authentication has succeeded, a proportion, in the first photographed image, of an area of a facial region authenticated successfully in the first facial authentication;
acquiring a second photographed image capturing the person and obtained by a second photographing device installed within a predetermined range from the first photographing device at the predetermined location and having a wider angle than that of the first photographing device, if the proportion is no smaller than a predetermined value;
performing second facial authentication of the second photographed image by use of the facial feature information;
outputting the second photographed image, if the second facial authentication has succeeded; and
register an association between the second photographed image and the identification information into a predetermined storage device, if the second facial authentication has succeeded.

10. A non-transitory computer-readable medium storing a photographing control program that causes a computer to execute:
a process of acquiring a first photographed image capturing a person and obtained by a first photographing device installed at a predetermined location;
a process of causing an authentication device storing an association between identification information and facial feature information of a predetermined person to perform first facial authentication of the first photographed image by use of the facial feature information;
a process of calculating, if the first facial authentication has succeeded, a proportion, in the first photographed image, of an area of a facial region authenticated successfully in the first facial authentication;
a process of acquiring a second photographed image capturing the person and obtained by a second photographing device installed within a predetermined range from the first photographing device at the predetermined location and having a wider angle than that of the first photographing device, if the proportion is no smaller than a predetermined value;
a process of causing the authentication device to perform second facial authentication of the second photographed image by use of the facial feature information;
a process of outputting the second photographed image, if the second facial authentication has succeeded; and
a process of registering an association between the second photographed image and the identification information into a predetermined storage device, if the second facial authentication has succeeded.

11. A non-transitory computer-readable medium storing a photographing control program that causes a computer configured to store an association between identification information and facial feature information of a predetermined person to execute:
- a process of acquiring a first photographed image capturing a person and obtained by a first photographing device installed at a predetermined location;
- a process of performing first facial authentication of the first photographed image by use of the facial feature information;
- a process of calculating, if the first facial authentication has succeeded, a proportion, in the first photographed image, of an area of a facial region authenticated successfully in the first facial authentication;
- a process of acquiring a second photographed image capturing the person and obtained by a second photographing device installed within a predetermined range from the first photographing device at the predetermined location and having a wider angle than that of the first photographing device, if the proportion is no smaller than a predetermined value;
- a process of performing second facial authentication of the second photographed image by use of the facial feature information;
- a process of outputting the second photographed image, if the second facial authentication has succeeded; and
- a process of registering an association between the second photographed image and the identification information into a predetermined storage device, if the second facial authentication has succeeded.

* * * * *